United States Patent
Valliappan et al.

(10) Patent No.: US 10,356,816 B2
(45) Date of Patent: Jul. 16, 2019

(54) RE-CONTENTION-BASED CO-EXISTENCE ON A SHARED COMMUNICATION MEDIUM

(71) Applicant: QUALCOMM Incorporated, San Diego, CA (US)

(72) Inventors: Nachiappan Valliappan, San Diego, CA (US); Ahmed Kamel Sadek, San Diego, CA (US); Peter Gaal, San Diego, CA (US); Tamer Adel Kadous, San Diego, CA (US); Andrei Dragos Radulescu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 15/240,584

(22) Filed: Aug. 18, 2016

(65) Prior Publication Data

US 2017/0055285 A1 Feb. 23, 2017

Related U.S. Application Data

(60) Provisional application No. 62/207,319, filed on Aug. 19, 2015.

(51) Int. Cl.
*H04W 74/08* (2009.01)
*H04W 16/14* (2009.01)
*H04L 5/14* (2006.01)

(52) U.S. Cl.
CPC .......... *H04W 74/08* (2013.01); *H04W 16/14* (2013.01); *H04W 74/085* (2013.01); *H04L 5/14* (2013.01)

(58) Field of Classification Search
CPC ... H04W 74/08; H04W 16/14; H04W 74/085; H04L 5/14

USPC .......................................... 370/276, 277, 280
See application file for complete search history.

(56) References Cited

U.S. PATENT DOCUMENTS

| | | | |
|---|---|---|---|
| 9,036,523 B2 | 5/2015 | Zhang | |
| 9,191,954 B2 | 11/2015 | Anto et al. | |
| 9,451,612 B2 | 9/2016 | Salem et al. | |
| 9,894,534 B2 | 2/2018 | Boudreau et al. | |
| 2011/0058493 A1 | 3/2011 | Kapadia et al. | |
| 2012/0327870 A1 | 12/2012 | Grandhi et al. | |

(Continued)

FOREIGN PATENT DOCUMENTS

| EP | 2819456 A1 | 12/2014 |
|---|---|---|
| WO | 2010104977 A1 | 9/2010 |

(Continued)

OTHER PUBLICATIONS

International Search Report and Written Opinion—PCT/US2016/047826—ISA/EPO—dated Nov. 4, 2016.

*Primary Examiner* — Obaidul Huq
(74) *Attorney, Agent, or Firm* — QUALCOMM Incorporated Muncy, Geissler, Olds & Lowe, P.C.

(57) ABSTRACT

Techniques for managing re-contention on a shared communication medium are disclosed. In order to facilitate re-contending for access to the communication medium, an access point may adjust one or more uplink transmission parameters associated with a triggering condition for invoking a contention timer. In addition or as an alternative, the access point may mute transmission on the communication medium during one or more symbol periods designated for transmission. In addition or as an alternative, the access point may configure a timing advance to create a re-contention gap.

26 Claims, 18 Drawing Sheets

(56) References Cited

U.S. PATENT DOCUMENTS

| | | | |
|---|---|---|---|
| 2013/0021982 A1* | 1/2013 | Kim | H04L 1/1887 370/328 |
| 2014/0086116 A1 | 3/2014 | Seo et al. | |
| 2015/0098397 A1 | 4/2015 | Damnjanovic et al. | |
| 2015/0223075 A1 | 8/2015 | Bashar et al. | |
| 2015/0264662 A1 | 9/2015 | Sahlin et al. | |
| 2016/0105897 A1* | 4/2016 | Liu | H04W 72/1226 370/235 |
| 2016/0278050 A1 | 9/2016 | Nory et al. | |
| 2017/0055259 A1 | 2/2017 | Valliappan et al. | |
| 2017/0055260 A1 | 2/2017 | Valliappan et al. | |
| 2017/0231003 A1 | 8/2017 | Godana et al. | |
| 2018/0014326 A1 | 1/2018 | Wang et al. | |

FOREIGN PATENT DOCUMENTS

| | | |
|---|---|---|
| WO | 2010129295 A1 | 11/2010 |
| WO | 2014019213 A1 | 2/2014 |
| WO | 2014043863 A1 | 3/2014 |

\* cited by examiner

RE-CONTENTION-BASED CO-EXISTENCE ON A SHARED COMMUNICATION MEDIUM

CROSS-REFERENCE TO RELATED APPLICATIONS

The present application claims the benefit of U.S. Provisional Application No. 62/207,319, entitled "Re-Contention-Based Co-Existence on a Shared Communication Medium," filed Aug. 19, 2015, assigned to the assignee hereof, and expressly incorporated herein by reference in its entirety.

The present application is also related to the following co-pending U.S. Patent Application(s): "Re-Contention-Based Co-Existence on a Shared Communication Medium," filed as U.S. application Ser. No. 15/240,678 on Aug. 18, 2016 and "Re-Contention-Based Co-Existence on a Shared Communication Medium," filed as U.S. application Ser. No. 15/240,750 on Aug. 18, 2016, each filed concurrently herewith, each assigned to the assignee hereof, and each expressly incorporated herein by reference in its entirety.

INTRODUCTION

Aspects of this disclosure relate generally to telecommunications, and more particularly to operations on a shared communication medium and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In cellular networks, "macro cell" access points provide connectivity and coverage to a large number of users over a certain geographical area. A macro network deployment is carefully planned, designed, and implemented to offer good coverage over the geographical region. To improve indoor or other specific geographic coverage, such as for residential homes and office buildings, additional "small cell," typically low-power access points have recently begun to be deployed to supplement conventional macro networks. Small cell access points may also provide incremental capacity growth, richer user experience, and so on.

Small cell LTE operations, for example, have been extended into the unlicensed frequency spectrum such as the Unlicensed National Information Infrastructure (U-NII) band used by Wireless Local Area Network (WLAN) technologies. This extension of small cell LTE operation is designed to increase spectral efficiency and hence capacity of the LTE system. However, it may also encroach on the operations of other Radio Access Technologies (RATs) that typically utilize the same unlicensed bands, most notably IEEE 802.11x WLAN technologies generally referred to as "Wi-Fi."

SUMMARY

The following summary is an overview provided solely to aid in the description of various aspects of the disclosure and is provided solely for illustration of the aspects and not limitation thereof.

In one example, a communication method is disclosed. The method may include, for example, contending for access to a communication medium for a series of subframes associated with a Time Division Duplexing (TDD) frame structure; transmitting on the communication medium during a first portion of the series of subframes; refraining from transmitting on the communication medium during a second portion of the series of subframes; adjusting one or more uplink transmission parameters associated with a triggering condition for invoking a contention timer; re-contending for access to the communication medium for a third portion of the series of subframes based on the contention timer; and transmitting on the communication medium during the third portion of the series of subframes.

In another example, a communication apparatus is disclosed. The apparatus may include, for example, at least one transceiver, at least one processor, and at least one memory coupled to the at least one processor. The at least one processor and the at least one memory may be configured to contend for access to a communication medium for a series of subframes associated with a TDD frame structure. The at least one transceiver may be configured to transmit on the communication medium during a first portion of the series of subframes and to refrain from transmitting on the communication medium during a second portion of the series of subframes. The at least one processor and the at least one memory may be further configured to adjust one or more uplink transmission parameters associated with a triggering condition for invoking a contention timer and to re-contend for access to the communication medium for a third portion of the series of subframes based on the contention timer. The at least one transceiver may be further configured to transmit on the communication medium during the third portion of the series of subframes.

In another example, another communication apparatus is disclosed. The apparatus may include, for example, means for contending for access to a communication medium for a series of subframes associated with a TDD frame structure; means for transmitting on the communication medium during a first portion of the series of subframes; means for refraining from transmitting on the communication medium during a second portion of the series of subframes; means for adjusting one or more uplink transmission parameters associated with a triggering condition for invoking a contention timer; means for re-contending for access to the communication medium for a third portion of the series of subframes based on the contention timer; and means for transmitting on the communication medium during the third portion of the series of subframes.

In another example, a transitory or non-transitory computer-readable medium is disclosed. The computer-readable medium may include, for example, code for contending for access to a communication medium for a series of subframes associated with a TDD frame structure; code for transmitting on the communication medium during a first portion of the series of subframes; code for refraining from transmitting on the communication medium during a second portion of the series of subframes; code for adjusting one or more uplink transmission parameters associated with a triggering condition for invoking a contention timer; code for re-contending for access to the communication medium for a third portion of the series of subframes based on the contention timer; and code for transmitting on the communication medium during the third portion of the series of subframes.

In another example, another communication method is disclosed. The method may include, for example, contending for access to a communication medium for a series of subframes associated with a TDD frame structure; transmitting on the communication medium during a first portion of the series of subframes; refraining from transmitting on the communication medium during a second portion of the series of subframes; muting transmission on the communication medium during one or more symbol periods designated for transmission during the series of subframes; re-contending, during the one or more symbol periods, for access to the communication medium for a third portion of the series of subframes; and transmitting on the communication medium during the third portion of the series of subframes.

In another example, a communication apparatus is disclosed. The apparatus may include, for example, at least one transceiver, at least one processor, and at least one memory coupled to the at least one processor. The at least one processor and the at least one memory may be configured to contend for access to a communication medium for a series of subframes associated with a TDD frame structure. The at least one transceiver may be configured to transmit on the communication medium during a first portion of the series of subframes and to refrain from transmitting on the communication medium during a second portion of the series of subframes. The at least one processor and the at least one memory may be further configured to mute transmission on the communication medium during one or more symbol periods designated for transmission during the series of subframes and to re-contend, during the one or more symbol periods, for access to the communication medium for a third portion of the series of subframes. The at least one transceiver may be further configured to transmit on the communication medium during the third portion of the series of subframes.

In another example, another communication apparatus is disclosed. The apparatus may include, for example, means for contending for access to a communication medium for a series of subframes associated with a TDD frame structure; means for transmitting on the communication medium during a first portion of the series of subframes; means for refraining from transmitting on the communication medium during a second portion of the series of subframes; means for muting transmission on the communication medium during one or more symbol periods designated for transmission during the series of subframes; means for re-contending, during the one or more symbol periods, for access to the communication medium for a third portion of the series of subframes; and means for transmitting on the communication medium during the third portion of the series of subframes.

In another example, another transitory or non-transitory computer-readable medium is disclosed. The computer-readable medium may include, for example, code for contending for access to a communication medium for a series of subframes associated with a TDD frame structure; code for transmitting on the communication medium during a first portion of the series of subframes; code for refraining from transmitting on the communication medium during a second portion of the series of subframes; code for muting transmission on the communication medium during one or more symbol periods designated for transmission during the series of subframes; code for re-contending, during the one or more symbol periods, for access to the communication medium for a third portion of the series of subframes; and code for transmitting on the communication medium during the third portion of the series of subframes.

In another example, another communication method is disclosed. The method may include, for example, contending for access to a communication medium for a series of subframes associated with a TDD frame structure; transmitting on the communication medium during a first portion of the series of subframes; refraining from transmitting on the communication medium during a second portion of the series of subframes; configuring a timing advance of the second portion of the series of subframes to create a re-contention gap between the second portion of the series of subframes and a third portion of the series of subframes; re-contending, during the re-contention gap, for access to the communication medium for the third portion of the series of subframes; and transmitting on the communication medium during the third portion of the series of subframes.

In another example, another communication apparatus is disclosed. The apparatus may include, for example, at least one transceiver, at least one processor, and at least one memory coupled to the at least one processor. The at least one processor and the at least one memory may be configured to contend for access to a communication medium for a series of subframes associated with a TDD frame structure. The at least one transceiver may be configured to transmit on the communication medium during a first portion of the series of subframes and to refrain from transmitting on the communication medium during a second portion of the series of subframes. The at least one processor and the at least one memory may be further configured to configure a timing advance of the second portion of the series of subframes to create a re-contention gap between the second portion of the series of subframes and a third portion of the series of subframes and re-contend, during the re-contention gap, for access to the communication medium for the third portion of the series of subframes. The at least one transceiver may be further configured to transmit on the communication medium during the third portion of the series of subframes.

In another example, another communication apparatus is disclosed. The apparatus may include, for example, means for contending for access to a communication medium for a series of subframes associated with a TDD frame structure; means for transmitting on the communication medium during a first portion of the series of subframes; means for refraining from transmitting on the communication medium during a second portion of the series of subframes; means for configuring a timing advance of the second portion of the series of subframes to create a re-contention gap between the second portion of the series of subframes and a third portion of the series of subframes; means for re-contending, during the re-contention gap, for access to the communication medium for the third portion of the series of subframes; and means for transmitting on the communication medium during the third portion of the series of subframes.

In another example, another transitory or non-transitory computer-readable medium is disclosed. The computer-readable medium may include, for example, code for contending for access to a communication medium for a series of subframes associated with a TDD frame structure; code for transmitting on the communication medium during a first portion of the series of subframes; code for refraining from transmitting on the communication medium during a second portion of the series of subframes; code for configuring a timing advance of the second portion of the series of subframes to create a re-contention gap between the second portion of the series of subframes and a third portion of the series of subframes; code for re-contending, during the re-contention gap, for access to the communication medium for the third portion of the series of subframes; and code for transmitting on the communication medium during the third portion of the series of subframes.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

The present disclosure relates generally to co-existence techniques between Radio Access Technologies (RATs) operating on a shared communication medium subject to contention. For deployments in which contiguous occupation of the communication medium is required, re-contention may be performed to re-access the communication medium for a period of downlink subframes following a period of uplink subframes. In some designs, re-contention may be facilitated by an uplink transmission control scheme in which uplink transmission parameters dictating, for example, transmission power, multi-user scheduling, or sub-band scheduling, may be adjusted to prevent or at least reduce the likelihood that uplink transmission will trigger a contention timer. In addition or as an alternative, transmission may be scheduled during one or more symbol periods of an uplink or downlink subframe while refraining from configuring transmission during those symbol periods in order to provide an opportunity for re-contention. In addition or as an alternative, a timing advance may be configured for the period of uplink subframes to create a re-contention gap prior to the period of downlink subframes in order to provide another opportunity for re-contention.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 1:
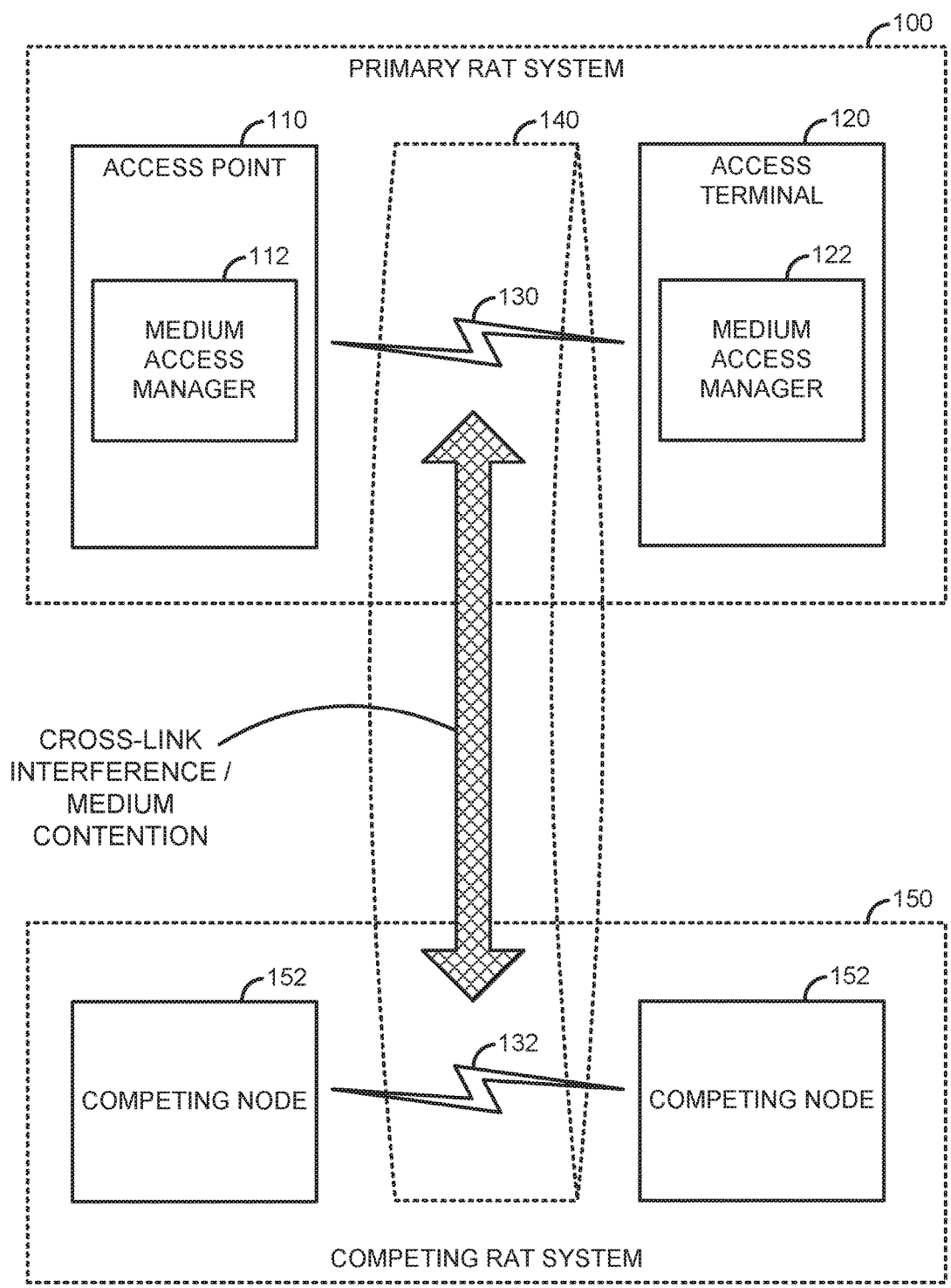
FIG. 1 is a system-level diagram illustrating an example wireless network environment.

FIG. 1 is a system-level diagram illustrating an example wireless network environment, shown by way of example as including a "primary" Radio Access Technology (RAT) system 100 and a "competing" RAT system 150. Each system may be composed of different wireless nodes generally capable of receiving and/or transmitting over a wireless link, including information related to various types of communication (e.g., voice, data, multimedia services, associated control signaling, etc.). The primary RAT system 100 is shown as including an access point 110 and an access terminal 120 in communication with each other over a wireless link 130. The competing RAT system 150 is shown as including two competing nodes 152 in communication with each other over a separate wireless link 132, and may similarly include one or more access points, access terminals, or other types of wireless nodes. As an example, the access point 110 and the access terminal 120 of the primary RAT system 100 may communicate via the wireless link 130 in accordance with Long Term Evolution (LTE) technology, while the competing nodes 152 of the competing RAT system 150 may communicate via the wireless link 132 in accordance with Wi-Fi technology. It will be appreciated that each system may support any number of wireless nodes distributed throughout a geographic region, with the illustrated entities being shown for illustration purposes only.

Unless otherwise noted, the terms "access terminal" and "access point" are not intended to be specific or limited to any particular RAT. In general, access terminals may be any wireless communication device allowing a user to communicate over a communications network (e.g., a mobile phone, router, personal computer, server, entertainment device, Internet of Things (IOT)/Internet of Everything (ME) capable device, in-vehicle communication device, etc.), and may be alternatively referred to in different RAT environments as a User Device (UD), a Mobile Station (MS), a Subscriber Station (STA), a User Equipment (UE), etc. Similarly, an access point may operate according to one or several RATs in communicating with access terminals depending on the network in which the access point is deployed, and may be alternatively referred to as a Base Station (BS), a Network Node, a NodeB, an evolved NodeB (eNB), etc. Such an access point may correspond to a small cell access point, for example. "Small cells" generally refer to a class of low-powered access points that may include or be otherwise referred to as femto cells, pico cells, micro cells, Wireless Local Area Network (WLAN) access points, other small coverage area access points, etc. Small cells may be deployed to supplement macro cell coverage, which may cover a few blocks within a neighborhood or several square miles in a rural environment, thereby leading to improved signaling, incremental capacity growth, richer user experience, and so on.

Returning to FIG. 1, the wireless link 130 used by the primary RAT system 100 and the wireless link 132 used by the competing RAT system 150 may operate over a shared communication medium 140. A communication medium of this type may be composed of one or more frequency, time, and/or space communication resources (e.g., encompassing one or more channels across one or more carriers). As an example, the communication medium 140 may correspond to at least a portion of an unlicensed frequency band. Although different licensed frequency bands have been reserved for certain communications (e.g., by a government entity such as the Federal Communications Commission (FCC) in the United States), some systems, in particular those employing small cell access points, have extended operation into unlicensed frequency bands such as the Unlicensed National Information Infrastructure (U-NII) band used by WLAN technologies including Wi-Fi.

Due to the shared use of the communication medium 140, there is the potential for cross-link interference between the wireless link 130 and the wireless link 132. Further, some RATs and some jurisdictions may require contention or "Listen Before Talk (LBT)" for access to the communication medium 140. As an example, a Clear Channel Assessment (CCA) protocol may be used in which each device verifies via medium sensing the absence of other traffic on a shared communication medium before seizing (and in some cases reserving) the communication medium for its own transmissions. In some designs, the CCA protocol may include distinct CCA Preamble Detection (CCA-PD) and CCA Energy Detection (CCA-ED) mechanisms for yielding the communication medium to intra-RAT and inter-RAT traffic, respectively. The European Telecommunications Standards Institute (ETSI), for example, mandates contention for all devices regardless of their RAT on certain communication media such as unlicensed frequency bands.

As will be described in more detail below, the access point 110 and/or the access terminal 120 may be variously configured in accordance with the teachings herein to provide or otherwise support the contention and re-contention techniques discussed briefly above. For example, the access point 110 may include a medium access manager 112 and the access terminal 120 may include a medium access manager 122. The medium access manager 112 and/or the medium access manager 122 may be configured in different ways to manage contending for access to the communication medium 140.

Figure 2:
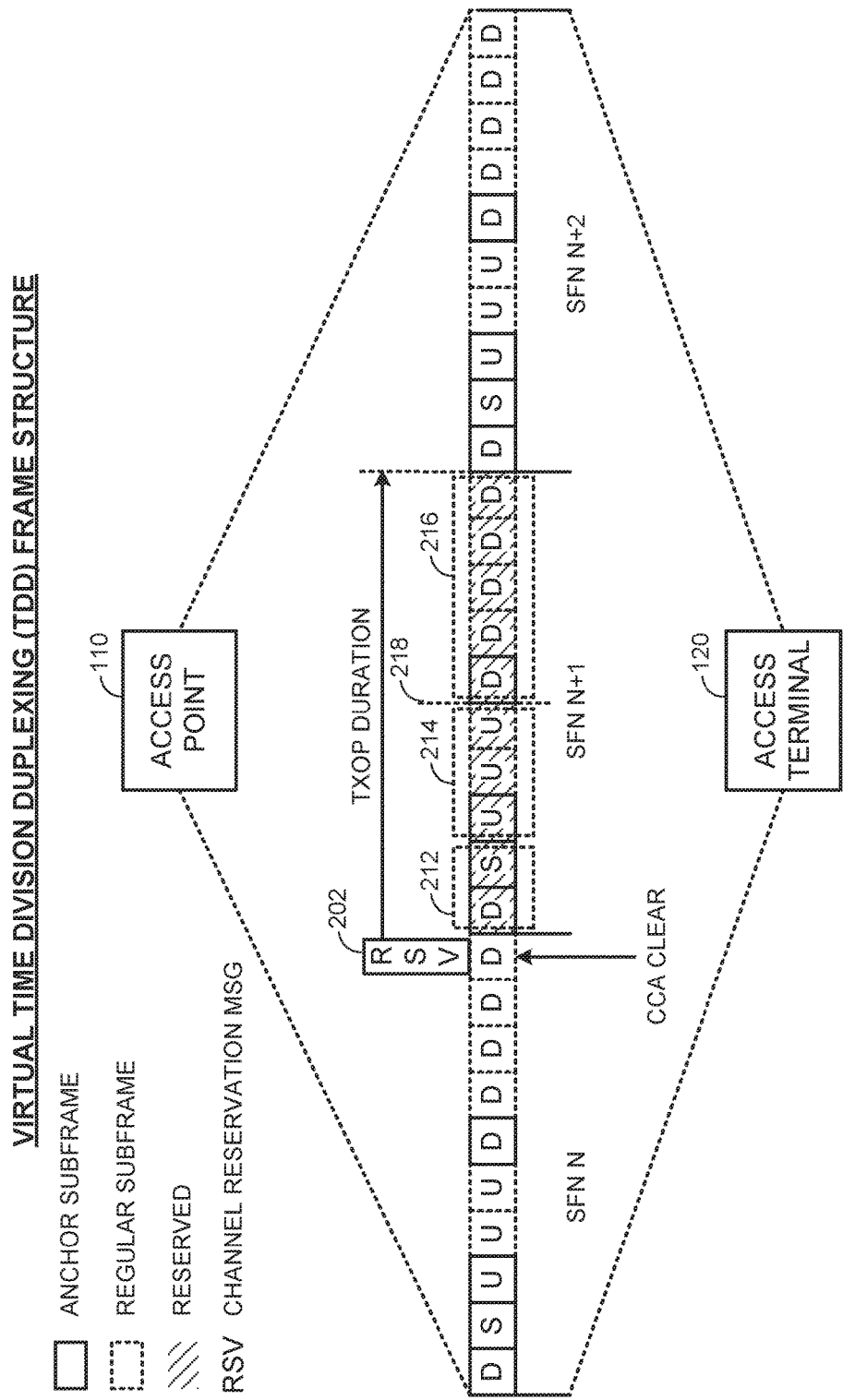
FIG. 2 illustrates an example virtual Time Division Duplexing (TDD) frame structure.

FIG. 2 illustrates an example virtual Time Division Duplexing (TDD) frame structure that may be implemented for the primary RAT system 100 on the communication medium 140 to facilitate contention-based access between the access point 110/access terminal 120 and the competing RAT system 150.

The illustrated frame structure includes a series of radio frames (RFs) that are numbered in accordance with a System Frame Number (SFN) numerology (SFN N, N+1, N+2, etc.) and divided into respective subframes (SFs), which may also be numbered for reference (e.g., SF0, SF1, etc.). As an example, the LTE frame structure includes system frames that are divided into 1024 numbered radio frames composed of 10 subframes each, which together constitute an SFN cycle (e.g., lasting 10.24 s for 10 ms radio frames having 1 ms subframes). The use of a frame structure may provide more natural and efficient coordination among devices than more ad hoc signaling techniques.

The example frame structure of FIG. 2 is TDD in that each subframe may be variously operated at different times as a downlink (D), uplink (U), or special (S) subframe. In general, downlink subframes are reserved for transmitting downlink information from the access point 110 to the access terminal 120, uplink subframes are reserved for transmitting uplink information from the access terminal 120 to the access point 110, and special subframes may include a downlink portion and an uplink portion separated by a guard period. Different arrangements of downlink, uplink, and special subframes within a radio frame may be referred to as different TDD configurations. Returning to the LTE example above, the TDD variant of the LTE frame structure includes 7 TDD configurations (TDD Config 0 through TDD Config 6), with each configuration having a different arrangement of downlink, uplink, and special subframes. For example, some TDD configurations may have more downlink subframes and some may have more uplink subframes to accommodate different traffic scenarios. In the illustrated example of FIG. 2, a TDD configuration is employed that is similar to TDD Config 3 in LTE. The particular TDD configuration employed may be broadcast by the access point 110 using a System Information Block (SIB) message, a new physical channel to indicate the TDD frame format in the control region, or the like (e.g., a SIB-1 message in LTE).

Although each TDD configuration is different, there may be one or more subframes that are the same across all TDD configurations. These subframes are referred to herein as anchor subframes. Returning again to the LTE example above, the subframe SF0 is a downlink subframe, SF1 is a special subframe, SF2 is an uplink subframe, and SF5 is a downlink subframe in each radio frame across each of the TDD configurations TDD Config 0 through TDD Config 6. In the illustrated example, the anchor subframes similarly correspond to the subframes SF0, SF1, SF2, and SF5 of each radio frame, although it will be appreciated that the specific anchor carrier designations may vary across different systems.

The example frame structure of FIG. 2 is virtual in that each subframe may or may not be occupied by primary RAT signaling in any given instance due to the contention procedure for accessing the communication medium 140. In general, if the access point 110 or the access terminal 120 fails to win contention for a given subframe that subframe may be silenced.

At some point during the contention process, the communication medium 140 becomes clear (e.g., CCA Clear) and the access point 110, for example, seizes it. In order to reserve the communication medium 140 for itself for a Transmission Opportunity (TXOP) having a certain duration (e.g., one radio frame), the access point 110 may send a channel reservation message (RSV) 202 defined for the competing RAT system 150. The channel reservation message 202 may be transmitted over the communication medium 140 (e.g., via a competing-RAT-specific transceiver also belonging to the access point 110) to reserve the communication medium 140 for primary RAT operation. Example channel reservation messages may include, for example, 802.11a Data packets, Clear-to-Send-to-Self (CTS2S) messages, Request-to-Send (RTS) messages, Clear-to-Send (CTS) messages, Physical Layer Convergence Protocol (PLCP) headers (e.g., a legacy signal (L-SIG), a high throughput signal (HT-SIG), or very high throughput signal (VHT-SIG)), and the like for a competing Wi-Fi RAT, or other similar messages defined for other competing RATs of interest. The channel reservation message 202 may include a duration indication (e.g., a Network Allocation Vector (NAV)) corresponding to the duration of the target TXOP for which the access point 110 contended for access.

In some designs, the channel reservation message 202 may be sent as a one-way communication not invoking any acknowledgement (e.g., CTS2S). In other designs, the channel reservation message 202 may be sent as a two-way handshake communication that is acknowledged by each receiving entity (e.g., CTS/RTS). In addition, the channel reservation message 202 may be sent as a deep handshake signal with a larger coverage area to reach additional, otherwise hidden nodes that may be impacted by primary RAT communication but not able to receive short-range channel reservation messages (e.g., eCTS/eRTS).

In some deployments, reservation of a given TXOP by the access point 110 may be sufficient to satisfy the contention requirements for all downlink and uplink transmissions that are scheduled during the TXOP. In other deployments, however, contiguous occupation of the communication medium 140 may be required. One or more uplink subframes situated between downlink or special subframes may create a transmission gap that disrupts the required continuity. As shown in FIG. 2, for example, while the access point 110 may transmit over the communication medium 140 during a first period 212 (including the first downlink subframe and special subframe of the TXOP) and a third period 216 (including the last five downlink subframes), the access point 110 may not transmit during an intervening second period 214 (including the middle three uplink subframes) which is designated for transmission by the access terminal 120. Thus, in some deployments, the access point 110 may be required to re-contend for access to the communication medium 140 for any downlink subframes that follow one or more uplink subframes, such as at the uplink-to-downlink transition boundary 218 between the second period 214 and the third period 216.

In some designs, the access point 110 may simply re-contend for access to the communication medium 140 in the next downlink subframe (e.g., the first downlink subframe following the uplink-to-downlink transition boundary 218). However, this may result in a loss of efficiency because the downlink subframe in which re-contention is performed may be unavailable for other signaling, particularly for RATs in which there is no partial subframe support. In other designs, the access point 110 may minimize the number of re-contention instances by selecting a TDD configuration that includes a relatively small number of uplink-to-downlink transitions. In LTE, for example, TDD Config 3 includes only one such transition within each radio frame. However, TDD Config 3 provides only a 30% duty cycle for uplink traffic, which may be insufficient for some scenarios.

A more flexible TDD configuration may also be employed in which an adaptable number of uplink subframes is provided in sequence at the end of a radio frame, thereby eliminating uplink-to-downlink transitions within the radio frame altogether. Even so, such a configuration still requires an uplink-to-downlink transition between radio frames, which, for any TXOP spanning more than one radio frame, may necessitate re-contention during—and therefore impede utilization of—the last uplink subframe of the radio frame or the first downlink subframe of the next radio frame.

Figure 3:
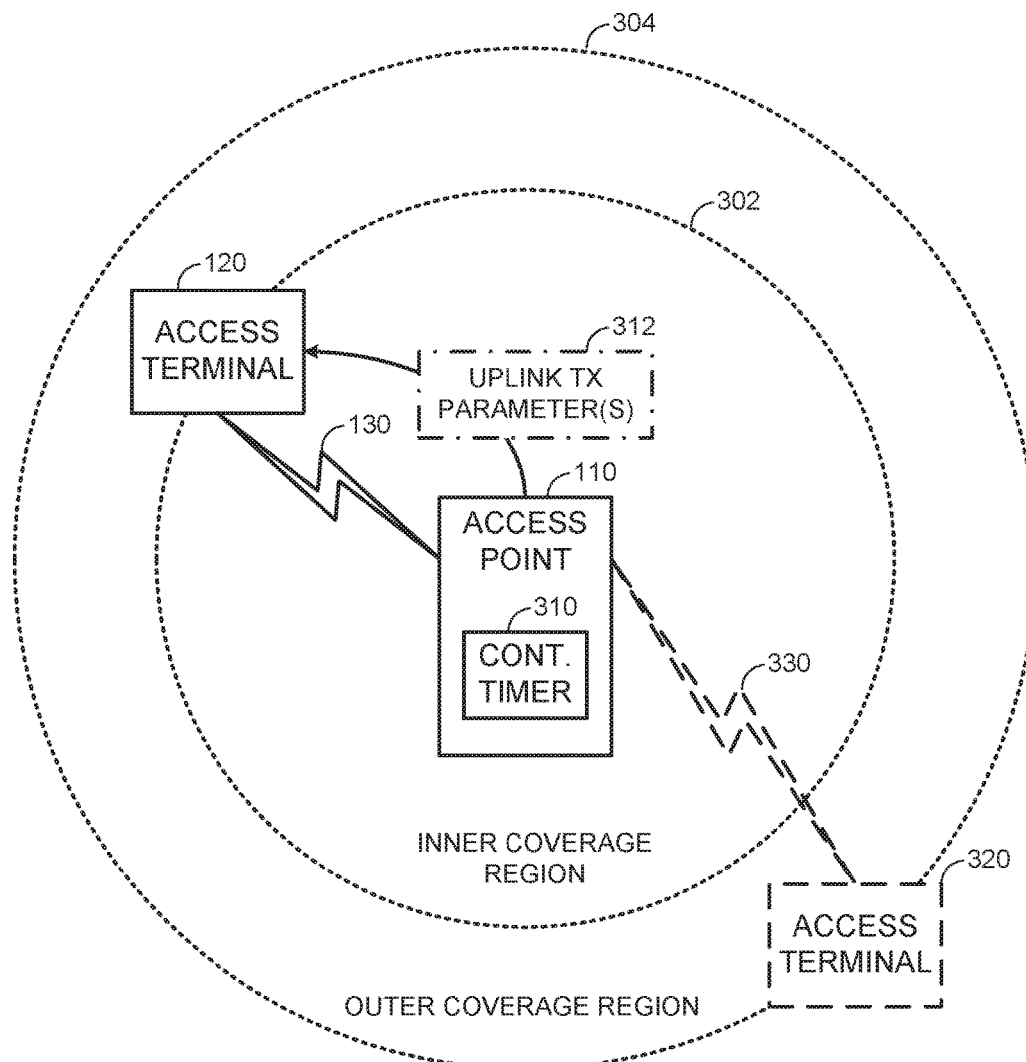
FIG. 3 is a system-level diagram illustrating an uplink transmission control scheme for facilitating communication medium re-contention.

FIG. 3 is a system-level diagram illustrating an uplink transmission control scheme for facilitating communication medium re-contention. In this example, the access point 110 is shown as communicating with the access terminal 120 over the communication medium 140 in an inner coverage region 302 where the corresponding wireless link 130 is relatively strong. By contrast, the access point 110 may also serve other access terminals that are located in an outer coverage region 304 with wireless links that are by comparison relatively weak (shown by way of example as the optional access terminal 320 with a corresponding wireless link 330).

Because the wireless link 130 between the access point 110 and the access terminal 120 is relatively strong, signaling sent from the access terminal 120 to the access point 110 during an uplink subframe (e.g., the last uplink subframe preceding the uplink-to-downlink transition boundary 218) may make it more difficult for the access point 110 to re-contend for access to the communication medium 140. In particular, signaling energy received at the access point 110 above a backoff threshold (e.g., −60 dBm) may trigger the invocation of a contention timer 310 that dictates a backoff period for which the access point 110 must wait before contending again. This backoff period may extend into or beyond the next downlink subframe (e.g., the first downlink subframe following the uplink-to-downlink transition boundary 218) and prevent the access point 110 from utilizing this subframe even though this subframe has already been reserved and even though the signaling deemed to be conflicting is actually from the access terminal 120 rather than, for example, the competing RAT system 150.

To better facilitate re-contention under such a scenario, in some designs, the access point 110 may adjust one or more uplink transmission parameters 312 associated with a triggering condition for invoking (starting/restarting) the contention timer 310. The transmission parameters 312 may be adjusted to prevent or at least reduce the likelihood that the contention timer 310 is triggered by signaling from the access terminal 120, in particular in anticipation of an uplink-to-downlink transition (e.g., during the last uplink subframe preceding the uplink-to-downlink transition boundary 218). The triggering condition may correspond, for example, to a backoff threshold (e.g., a threshold signal strength for a threshold duration). The transmission parameters 312 may be adjusted in response to the proximity of the access terminal 120 to the access point 110.

Figure 4:
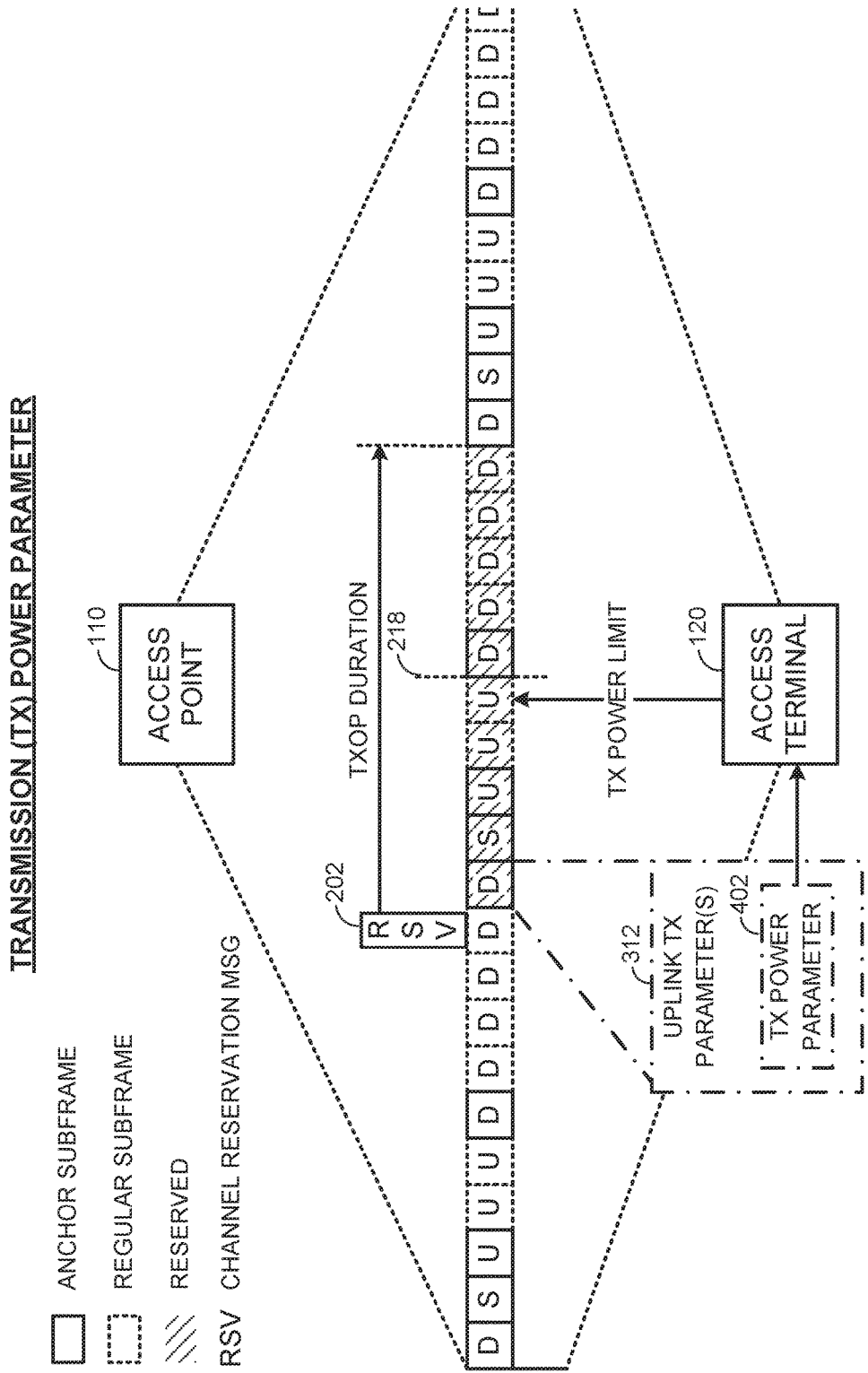
FIG. 4 illustrates an example of uplink transmission parameter adjustment in accordance with the TDD frame structure of FIG. 2.

FIG. 4 illustrates an example of uplink transmission parameter adjustment in accordance with the TDD frame structure of FIG. 2. It will be appreciated that adjustments to the uplink transmission parameters 312 may be conveyed to the access terminal 120 in different ways, including as part of different direct or broadcast messaging schemes as well as at different times. The particular timing and message format shown in FIG. 4 is provided for illustrations purposes only.

In this example, the transmission parameters 312 may include a transmission power parameter 402. The transmission power parameter 402 may be adjusted to limit the signal strength or the number of transmission resources (e.g., number of resource blocks) afforded to the access terminal 120 such that the signaling energy of the access terminal 120 as perceived by the access point 110 is not high enough to meet the triggering condition for invoking the contention timer 310. While a reduction in transmission power may provide poorer performance with higher relative interference for the access terminal 120, because of its proximity to the access point 110 this level of performance may still be satisfactory while allowing the access point 110 to immediately re-contend for access to the communication medium 140. Meanwhile, returning to the example of FIG. 3, the distance of the other access terminal 320 operating in the outer coverage region 304 makes it unlikely that the signaling energy of the access terminal 320 as perceived by the access point 110 will be high enough to meet the triggering condition for invoking the contention timer 310. The prior reservation makes it also unlikely that interference from other sources such as the competing RAT system 150 will impede the re-contention process.

Figure 5:
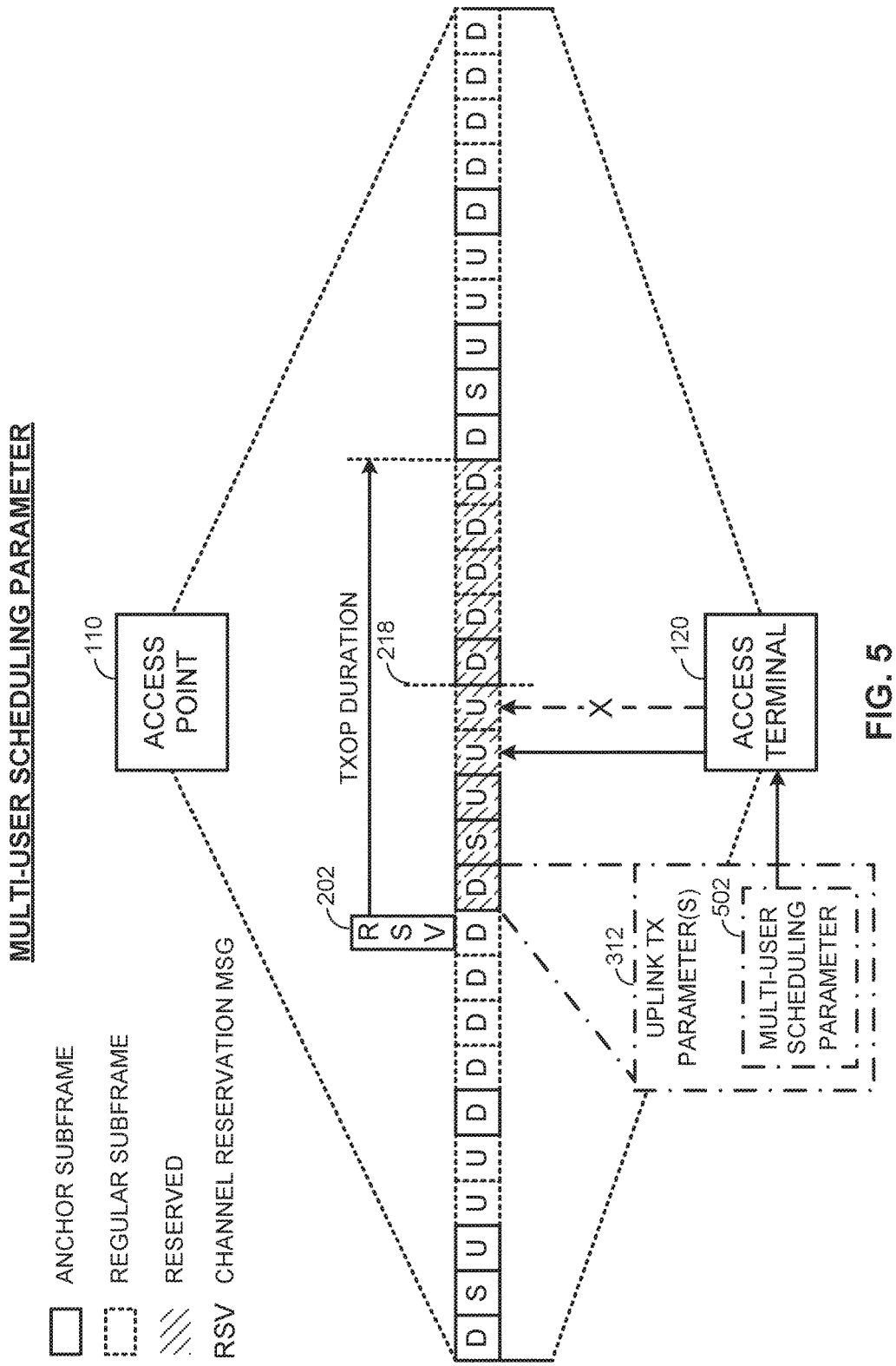
FIG. 5 illustrates another example of uplink transmission parameter adjustment in accordance with the TDD frame structure of FIG. 2.

FIG. 5 illustrates another example of uplink transmission parameter adjustment in accordance with the TDD frame structure of FIG. 2. It will again be appreciated that adjustments to the uplink transmission parameters 312 may be conveyed to the access terminal 120 in different ways, including as part of different direct or broadcast messaging schemes as well as at different times. The particular timing and message format shown in FIG. 5 is provided for illustrations purposes only.

In this example, the uplink transmission parameters 312 may include a multi-user scheduling parameter 502. The multi-user scheduling parameter 502 may be adjusted to schedule the access terminal 120 only in earlier uplink subframes (e.g., the second-to-last uplink subframe preceding the uplink-to-downlink transition boundary 218) where the contention timer 310 is not problematic. Meanwhile, returning again to the example of FIG. 3, the other access terminal 320 operating in the outer coverage region 304 may be more safely scheduled closer to an uplink-to-downlink transition (e.g., during the last uplink subframe preceding the uplink-to-downlink transition boundary 218). While this approach to scheduling may diminish certain benefits related to scheduling time diversity, each access terminal may still be scheduled fairly and the distance of the other access terminal 320 operating in the outer coverage region 304 makes it unlikely that it will meet the triggering condition for invoking the contention timer 310.

Figure 6:
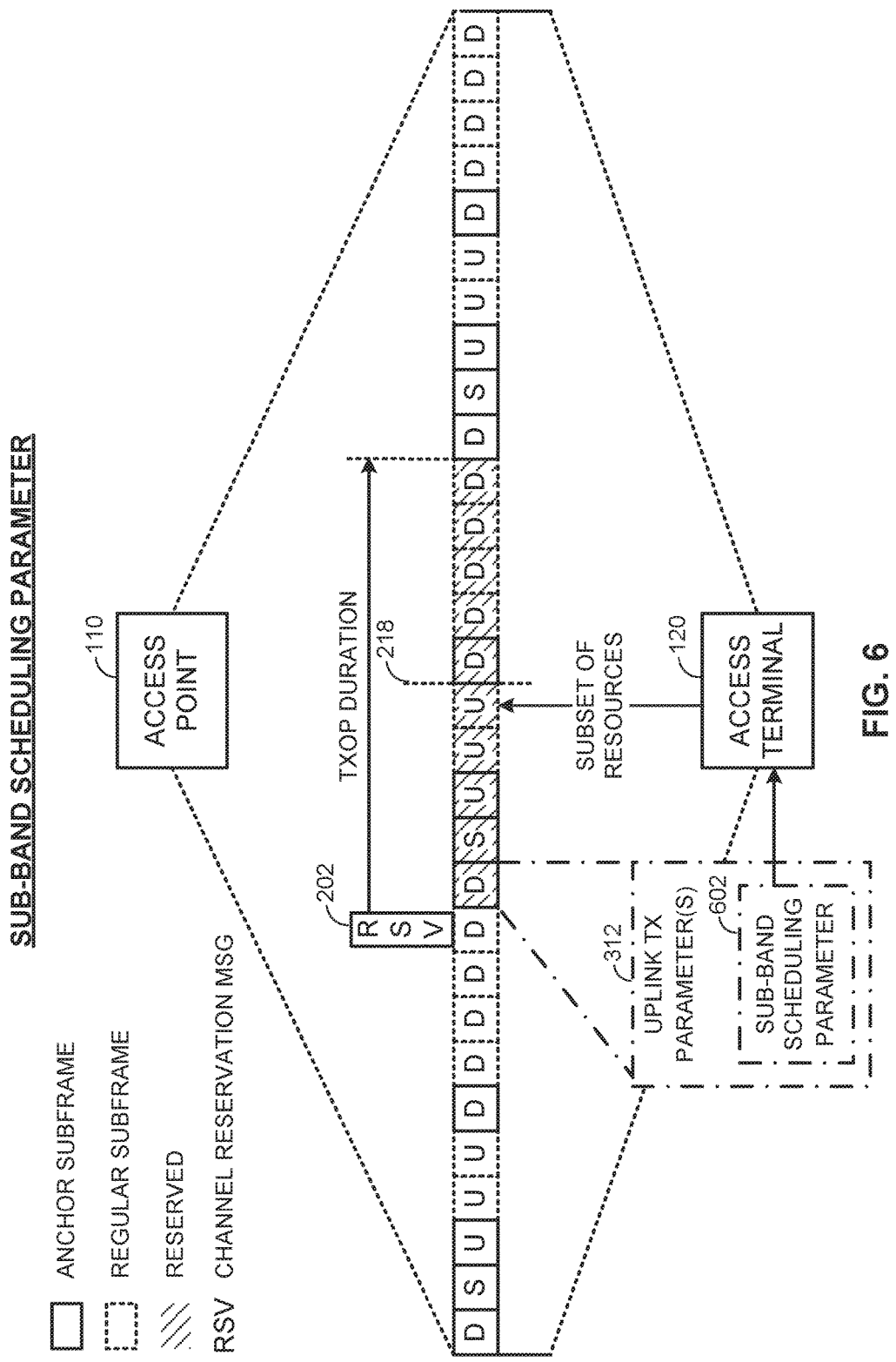
FIG. 6 illustrates another example of uplink transmission parameter adjustment in accordance with the TDD frame structure of FIG. 2.

FIG. 6 illustrates another example of uplink transmission parameter adjustment in accordance with the TDD frame structure of FIG. 2. It will again be appreciated that adjustments to the uplink transmission parameters 312 may be conveyed to the access terminal 120 in different ways, including as part of different direct or broadcast messaging schemes as well as at different times. The particular timing and message format shown in FIG. 6 is provided for illustrations purposes only.

In this example, the transmission parameters 312 may include a sub-band scheduling parameter 602. In a scenario in which it is impractical for the access point 110 to schedule the access terminal 120 around an uplink-to-downlink transition (e.g., when there are no other access terminals like the access terminal 320), the sub-band scheduling parameter may be adjusted to schedule the access terminal 120 only in a subset of resources spanning the reserved bandwidth (e.g., every other resource block) and the access point 110 may monitor signaling energy in a complementary set of resources (e.g., the unscheduled set of resource blocks). While the monitored signaling energy may still conform to contention requirements by consisting of a wideband measurement in the sense that the complementary set of resources span a wideband range, it is unlikely that it will meet the triggering condition for invoking the contention timer 310.

Figure 7:
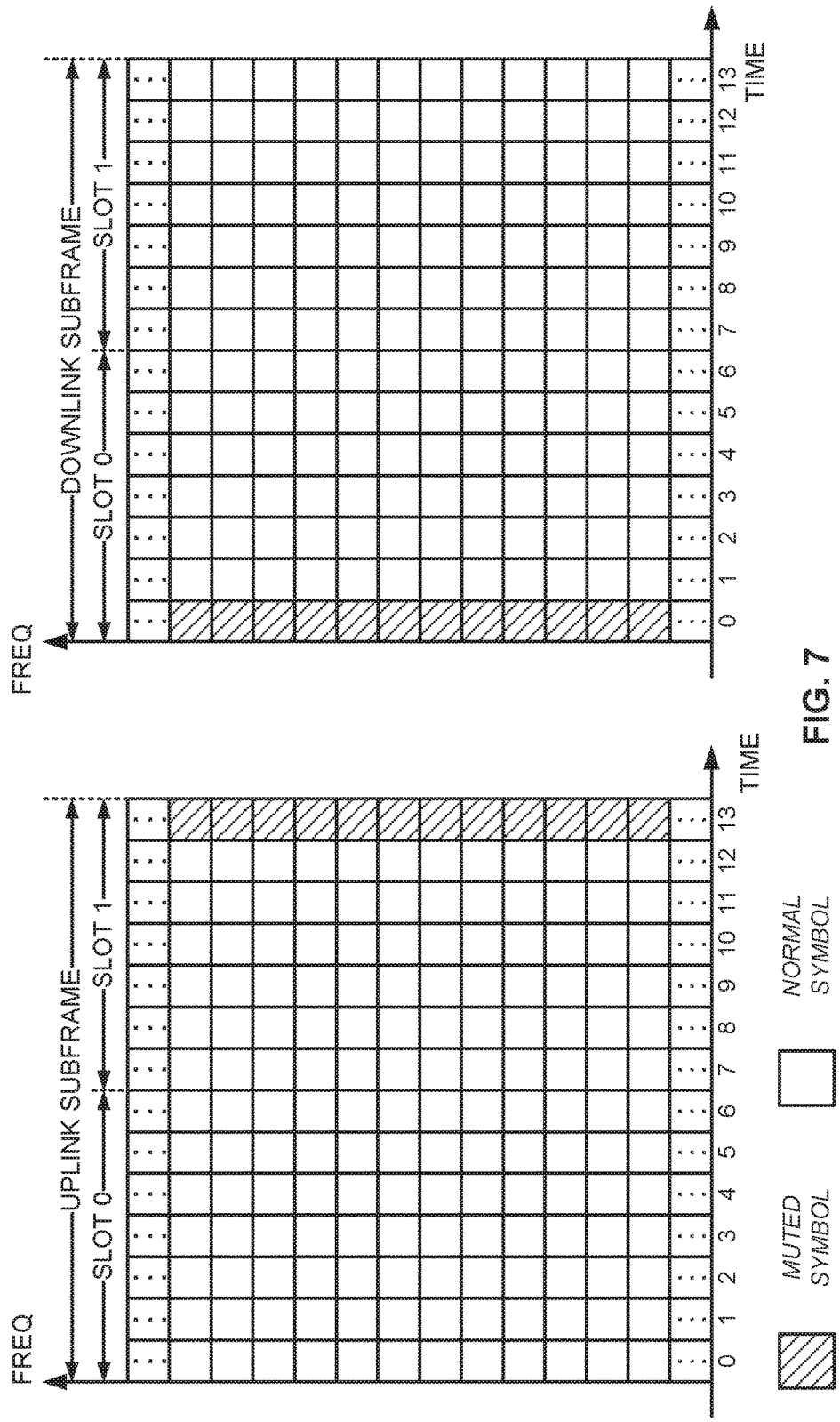
FIG. 7 is a resource map diagram illustrating an example physical channel muting scheme for facilitating communication medium re-contention.

FIG. 7 is a resource map diagram illustrating an example physical channel muting scheme for facilitating communication medium re-contention. As shown, one or more symbols at a given symbol period/subcarrier location may be muted in either uplink subframes, downlink subframes, or a combination thereof. In the illustrated example, one symbol period is shown as being muted but it will be appreciated that more than one symbol period may be muted as appropriate for a particular contention scheme. Further, each subcarrier in a given symbol period is shown as being muted but it will be appreciated that only a subset of symbols may instead be muted in each symbol period as appropriate to map to a given channel.

By designating for transmission (e.g., via scheduling or otherwise configuring) one or more of the last symbol periods during an uplink subframe (e.g., the last uplink subframe preceding the uplink-to-downlink transition boundary 218) or one or more of the first symbol periods during a downlink subframe (e.g., the first downlink subframe following the uplink-to-downlink transition boundary 218) and then muting transmission during these symbol periods, the access point 110 may in effect reserve these symbol periods for re-contention. This may be done without compromising the entire subframe.

Figure 8:
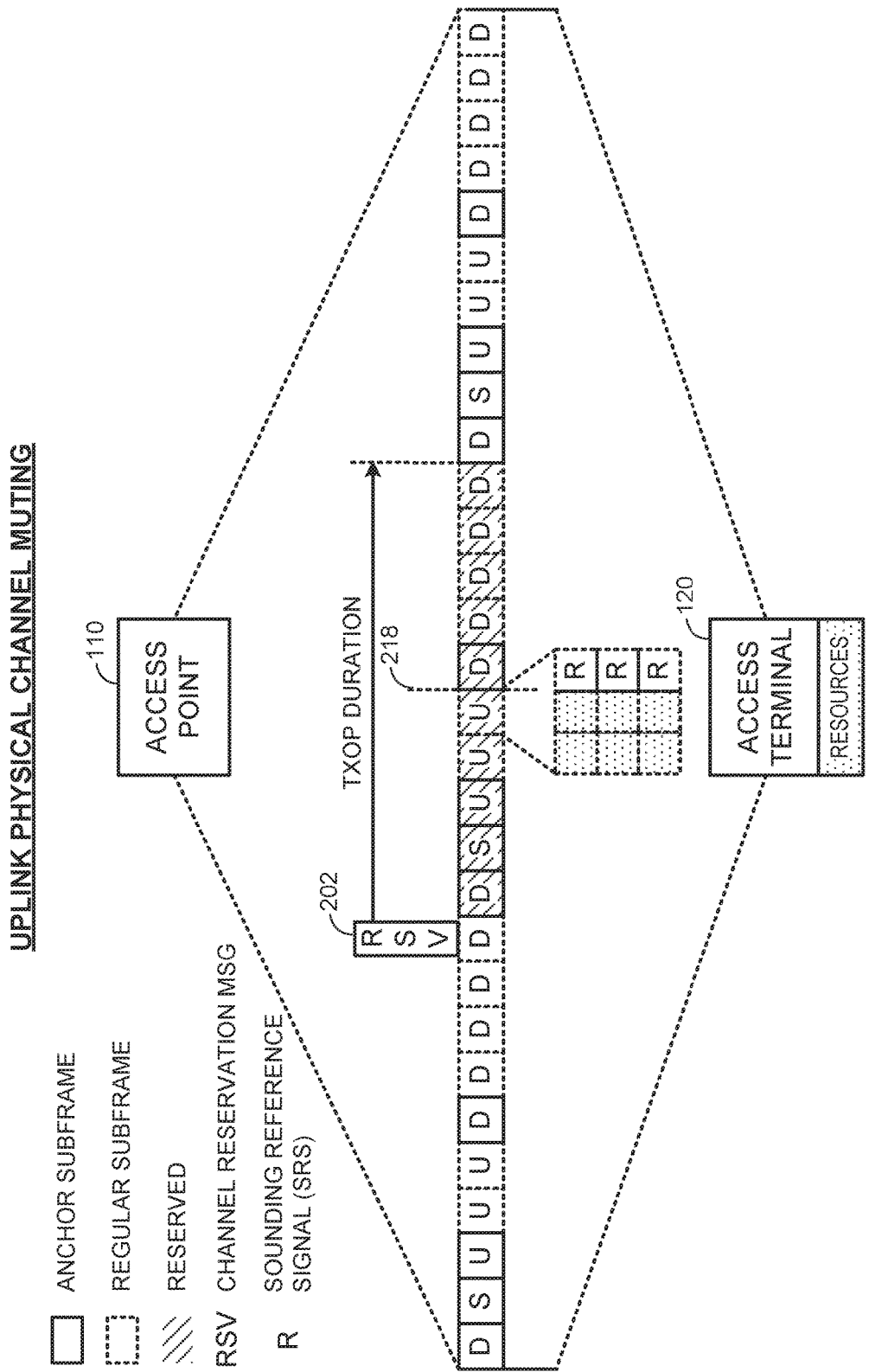
FIG. 8 illustrates an example of physical channel muting in the uplink direction in accordance with the TDD frame structure of FIG. 2.

FIG. 8 illustrates an example of physical channel muting in the uplink direction in accordance with the TDD frame structure of FIG. 2. As shown, resources during the last symbol period(s) of the uplink subframe preceding the uplink-to-downlink transition boundary 218 may be designated for reference signaling, for example, but not configured for any access terminal including the access terminal 120.

In the illustrated example, the access point 110 may advertise a Sounding Reference Signal (SRS) gap, for example, during the last uplink subframe preceding the uplink-to-downlink transition boundary 218 and then refrain from configuring the access terminal 120 or any other access terminal for SRS transmission during this time. Ordinarily, SRS signaling is designated for a set of symbols of the last symbol period of an uplink subframe and used to help facilitate wideband uplink channel estimation for use in uplink power control, link adaptation, sub-band scheduling (e.g., frequency-dependent uplink scheduling), and so on. The access terminal 120 may be configured to understand that any symbol period designated for SRS signaling may not be used for other transmissions. In this way, some channels such as a Physical Uplink Control Channel (PUCCH) may be completely silenced and other channels such as a Physical Uplink Shared Channel (PUSCH) may be partially silenced (referred to herein as puncturing) during this time to provide an opportunity for re-contention.

Figure 9:
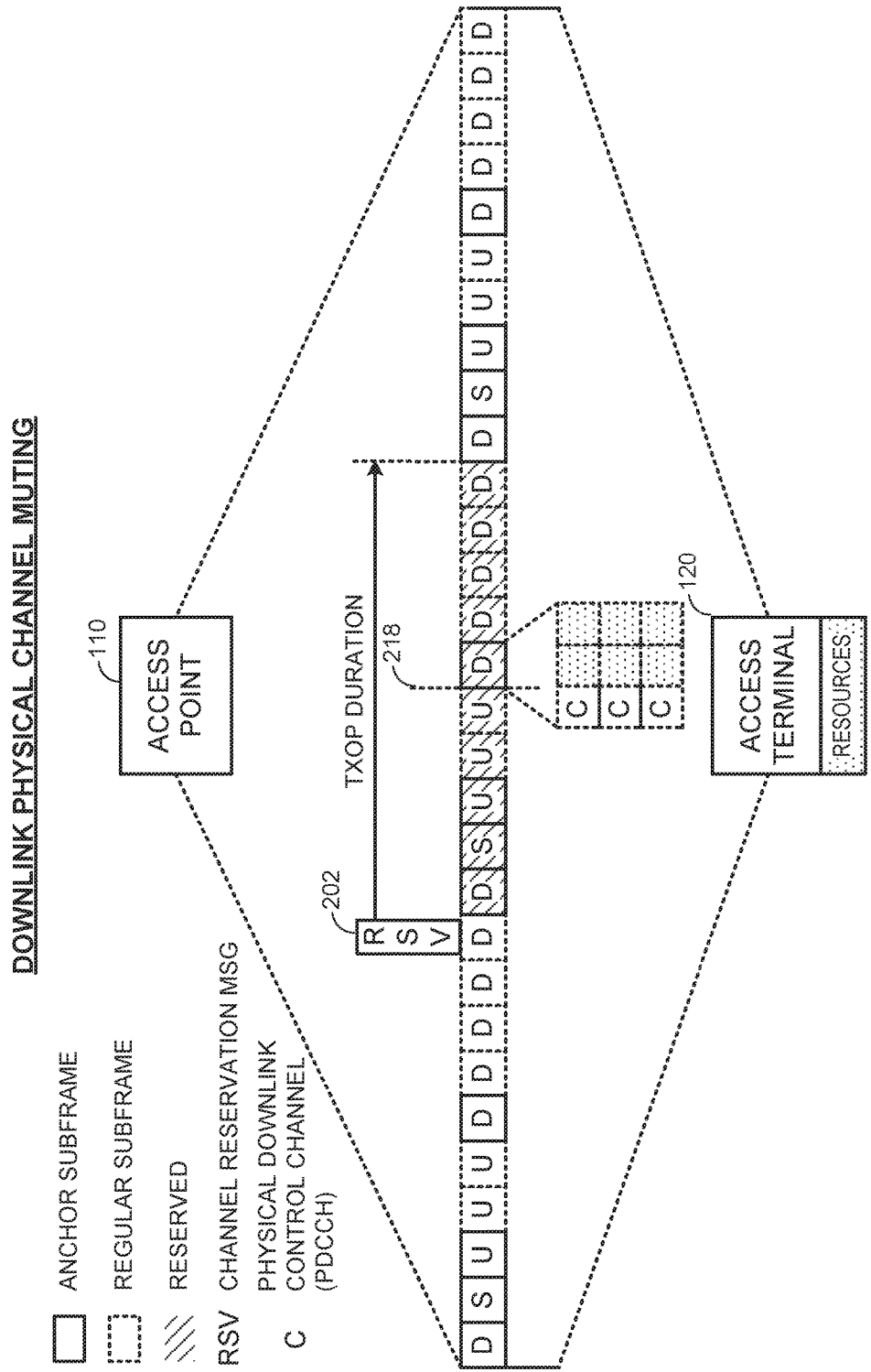
FIG. 9 illustrates an example of physical channel muting in the downlink direction in accordance with the TDD frame structure of FIG. 2.

FIG. 9 illustrates an example of physical channel muting in the downlink direction in accordance with the TDD frame structure of FIG. 2. As shown, resources during the first symbol period(s) of the downlink subframe following the uplink-to-downlink transition boundary 218 may be configured for control signaling, for example, but the control signaling may be omitted.

In the illustrated example, the access point 110 may mute an ordinarily configured Physical Downlink Control Channel (PDCCH) during the first downlink subframe (or the first few downlink subframes) following the uplink-to-downlink transition boundary 218 by refraining from sending any actual PDCCH transmissions during this time. Instead, the access point 110 may send the requisite control signaling via another channel (e.g., using Enhanced PDCCH (ePDCCH) over a Physical Downlink Shared Channel (PDSCH)) or rely on cross-carrier scheduling (e.g., via a corresponding Primary Cell (PCell) for PDCCH associated with a Secondary Cell (SCell)). Although there may be a loss of efficiency as well as legacy support for some access terminals, this time may be used to provide another opportunity for re-contention.

Figure 10:
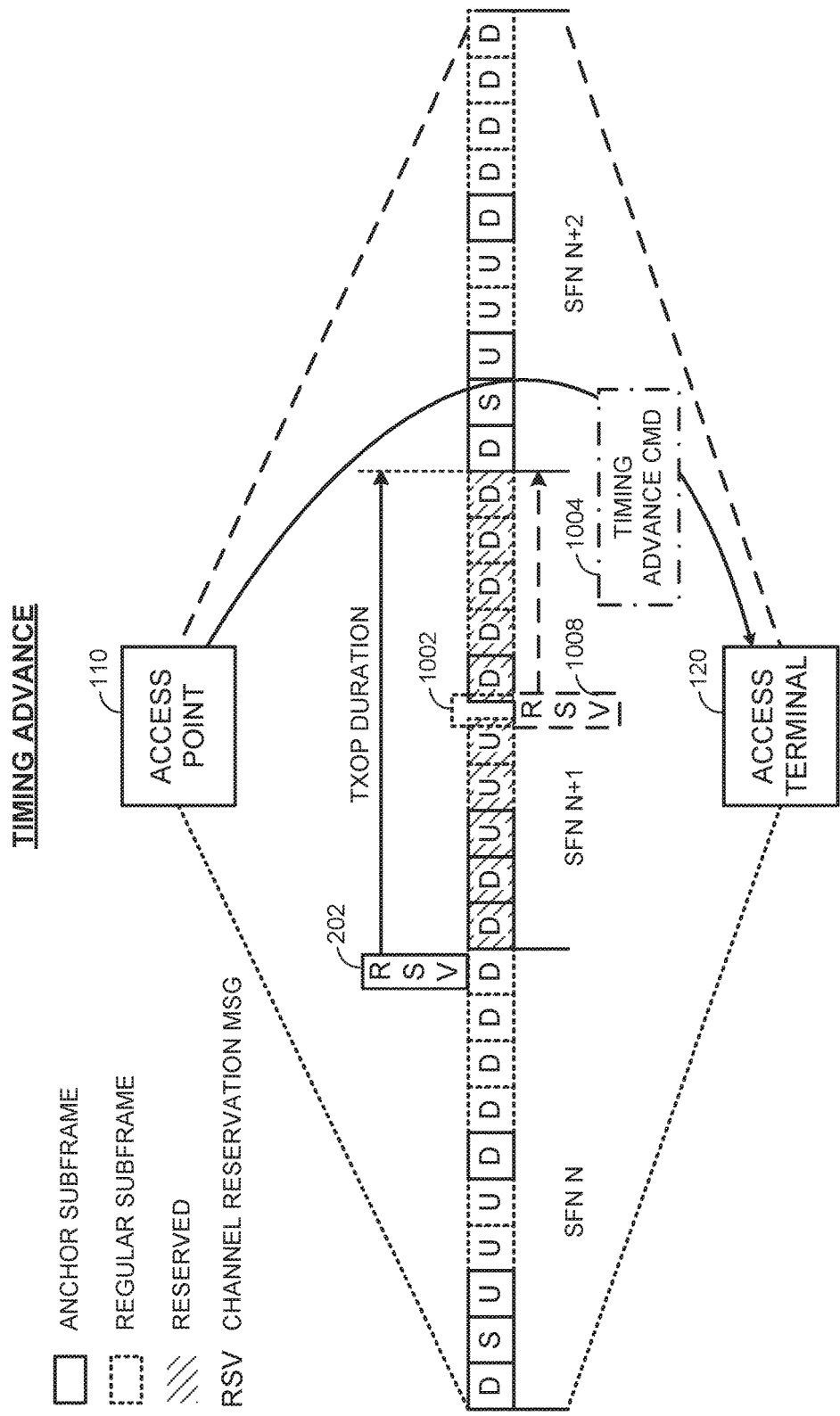
FIG. 10 illustrates an example of a timing advance scheme for facilitating communication medium re-contention.

FIG. 10 illustrates an example of a timing advance scheme for facilitating communication medium re-contention. In this example, a timing advance mechanism is used in conjunction with the virtual TDD frame structure of FIG. 2.

As shown, in order to provide a re-contention gap 1002, the timing of the uplink subframes in a reserved TXOP may be advanced such that each uplink subframe commences earlier than normally scheduled. This may be achieved by sending a timing advance command 1004 to the access terminal 120. The re-contention gap 1002 may be used by the access point 110 to re-contend for access to the communication medium 140.

Figure 11:
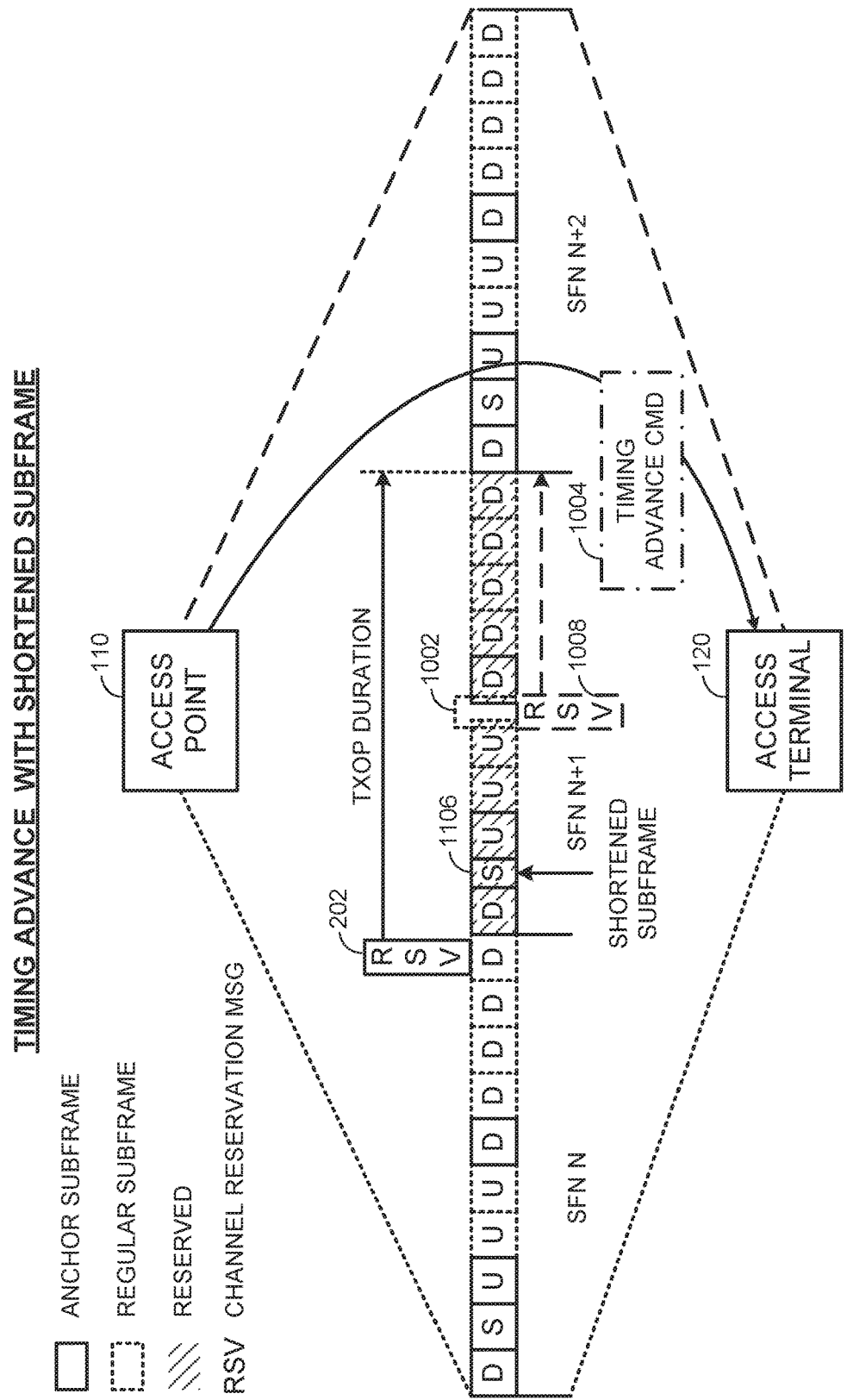
FIG. 11 illustrates another example of a timing advance scheme for facilitating communication medium re-contention.

FIG. 11 illustrates another example of a timing advance scheme for facilitating communication medium re-contention. This example is similar to that of FIG. 10, except that the timing advance command 1004 further instructs the access terminal 120 to shorten a preceding subframe (shown by way of example as the shortened special subframe 1106) and commence the next uplink subframe early.

As an example, the timing advance may pull the uplink subframes into the shortened special subframe 1106 by a few (e.g., 1-3) symbol periods and thereby provide a re-contention gap 1002 on the order of a few hundred microseconds (e.g., 140 microseconds for a timing advance of 2 symbol periods having a duration of 70 microseconds each).

Returning to FIG. 10, in some designs, the access point 110 may send an (optional) supplemental channel reservation message 1008, as shown, upon re-seizing the communication medium 140 as an additional protection. The prior reservation makes it unlikely that interference from other sources such as the competing RAT system 150 will impede the re-contention process.

Figure 12:
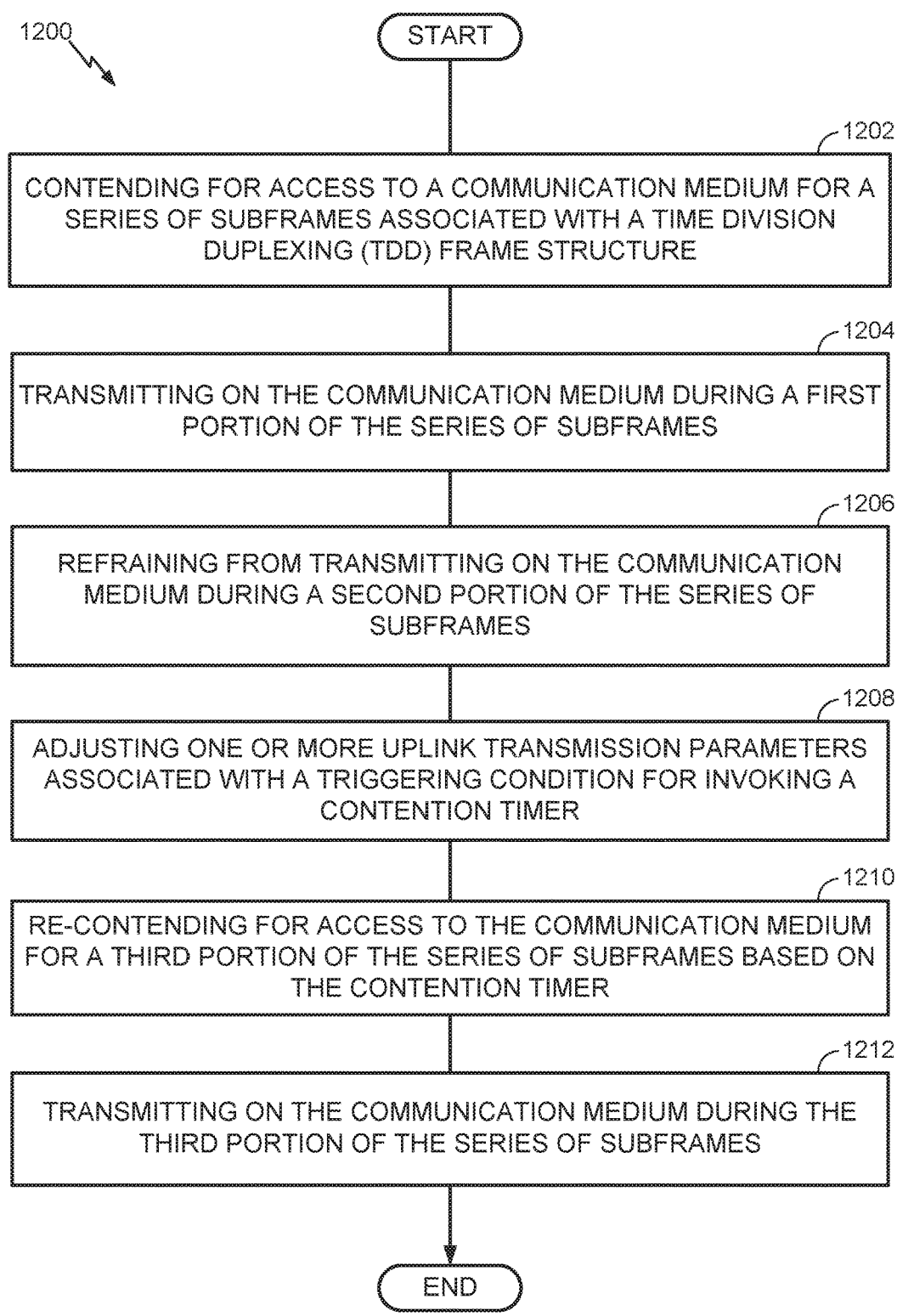
FIG. 12 is a flow diagram illustrating an example method of communication in accordance with the techniques described herein.

FIG. 12 is a flow diagram illustrating an example method of communication in accordance with the techniques described above. The method 1200 may be performed, for example, by an access point (e.g., the access point 110 illustrated in FIG. 1) operating on a shared communication medium. As an example, the communication medium may include one or more time, frequency, or space resources on an unlicensed radio frequency band shared between LTE technology and Wi-Fi technology devices.

As shown, the access point may contend for access to a communication medium for a series of subframes associated with a TDD frame structure (block 1202). The access point may then transmit on the communication medium during a first portion of the series of subframes (block 1204). The access point may, however, refrain from transmitting on the communication medium during a second portion of the series of subframes (block 1206).

At some point, the access point may adjust one or more uplink transmission parameters associated with a triggering condition for invoking a contention timer (block 1208). It will be appreciated that this operation may be performed at various times in relation to the other operations illustrated in FIG. 12, and that the listing of operations in FIG. 12 is not meant to convey a required or preferred ordering.

The access point may subsequently re-contend for access to the communication medium for a third portion of the series of subframes based on the contention timer (block 1210) and transmit on the communication medium during the third portion of the series of subframes (block 1212).

As discussed in more detail above, the triggering condition may include, for example, a backoff threshold. The adjusting (block 1208) may include transmitting the one or more uplink transmission parameters to an access terminal and may also be performed in response to a proximity of the access terminal to the access point.

In some designs, the one or more uplink transmission parameters may include a transmission power parameter, with the adjusting (block 1208) including limiting a signal strength or a number of transmission resources associated with an access terminal to below a level associated with the triggering condition. In addition or as an alternative, the one or more uplink transmission parameters may include a multi-user scheduling parameter, with the adjusting (block 1208) including refraining from scheduling any access terminals having a signal strength above a threshold in a subframe that is adjacent to the third portion of the series of subframes. In addition or as an alternative, the one or more uplink transmission parameters may include a sub-band scheduling parameter, with the adjusting (block 1208) including scheduling an access terminal in a first subset of resources of the second portion of the series of subframes and the re-contending (block 1210) including monitoring signaling on a second subset of resources of the second portion of the series of subframes different from the first subset of resources.

As also discussed above, a channel reservation message may be transmitted to reserve the communication medium for the series of subframes.

Figure 13:
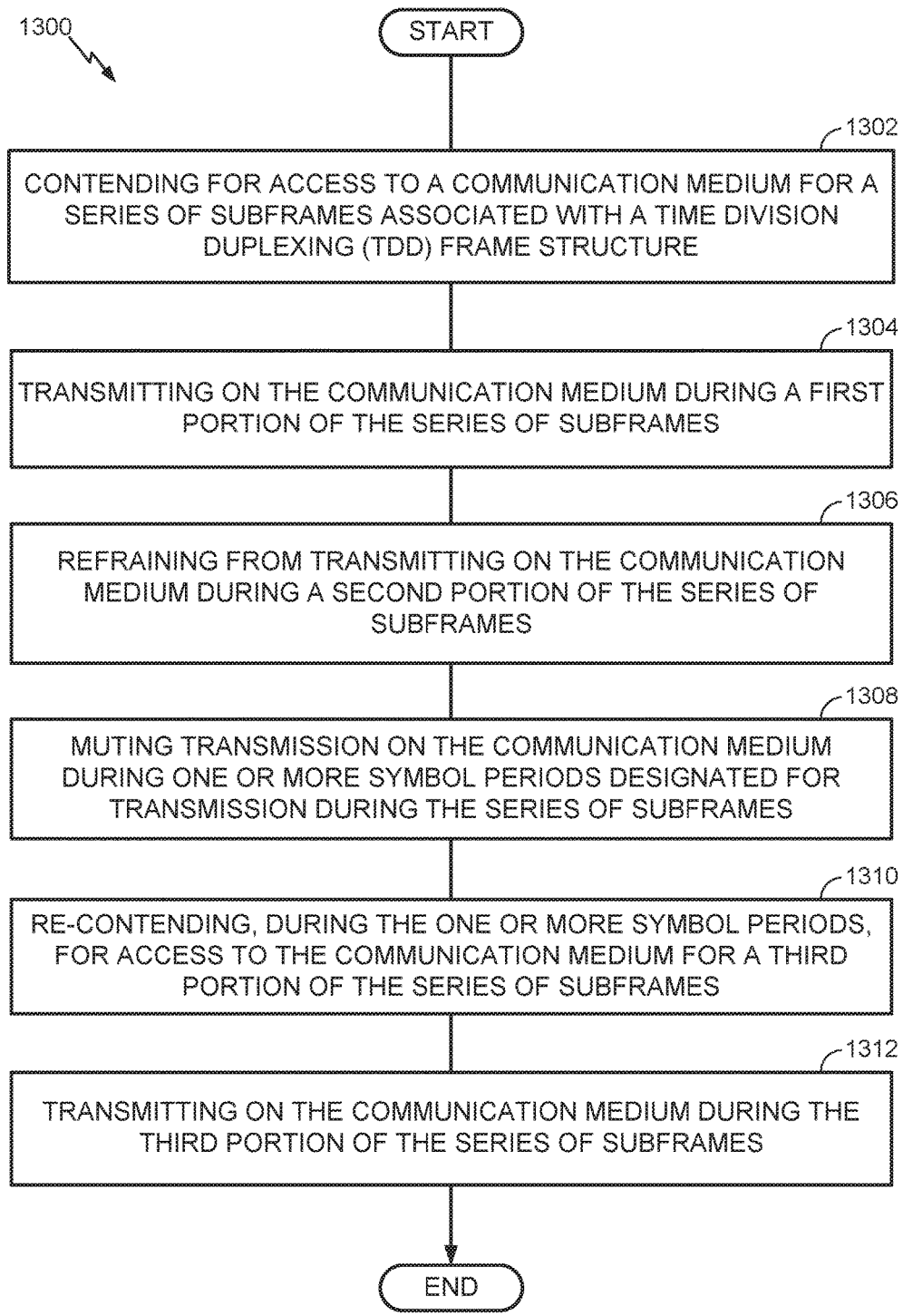
FIG. 13 is a flow diagram illustrating another example method of communication in accordance with the techniques described herein.

FIG. 13 is a flow diagram illustrating another example method of communication in accordance with the techniques described above. The method 1300 may be performed, for example, by an access point (e.g., the access point 110 illustrated in FIG. 1) operating on a shared communication medium. As an example, the communication medium may include one or more time, frequency, or space resources on an unlicensed radio frequency band shared between LTE technology and Wi-Fi technology devices.

As shown, the access point may contend for access to a communication medium for a series of subframes associated with a TDD frame structure (block 1302). The access point may then transmit on the communication medium during a first portion of the series of subframes (block 1304). The access point may, however, refrain from transmitting on the communication medium during a second portion of the series of subframes (block 1306).

At some point, the access point may mute transmission on the communication medium during one or more symbol periods designated for transmission during the series of subframes (block 1308). It will be appreciated that this operation may be performed at various times in relation to the other operations illustrated in FIG. 13, and that the listing of operations in FIG. 13 is not meant to convey a required or preferred ordering.

The access point may subsequently re-contend, during the one or more symbol periods, for access to the communication medium for a third portion of the series of subframes (block 1310). The access point may then transmit on the communication medium during the third portion of the series of subframes (block 1312).

As discussed in more detail above, the one or more symbol periods may include, for example, a last symbol period of a last uplink subframe in the second portion of the series of subframes, with the muting (block 1308) including refraining from configuring any access terminals for transmission during the last symbol period of the last uplink subframe. As an example, the one or more symbol periods may be designated for transmission of an SRS. The access point may broadcast an indication of an SRS gap during the one or more symbol periods.

As further discussed above in more detail, the one or more symbol periods may include, for example, a first symbol period of a first downlink subframe in the third portion of the series of subframes, with the muting (block 1308) including refraining from transmitting by an access point during the first symbol period of the first downlink subframe. As an example, the one or more symbol periods may be designated for transmission of a PDCCH. Here, the access point may send control signaling designated for the PDCCH via another channel or another carrier (than that of the PDCCH).

As also discussed above, a channel reservation message may be transmitted to reserve the communication medium for the series of subframes.

Figure 14:
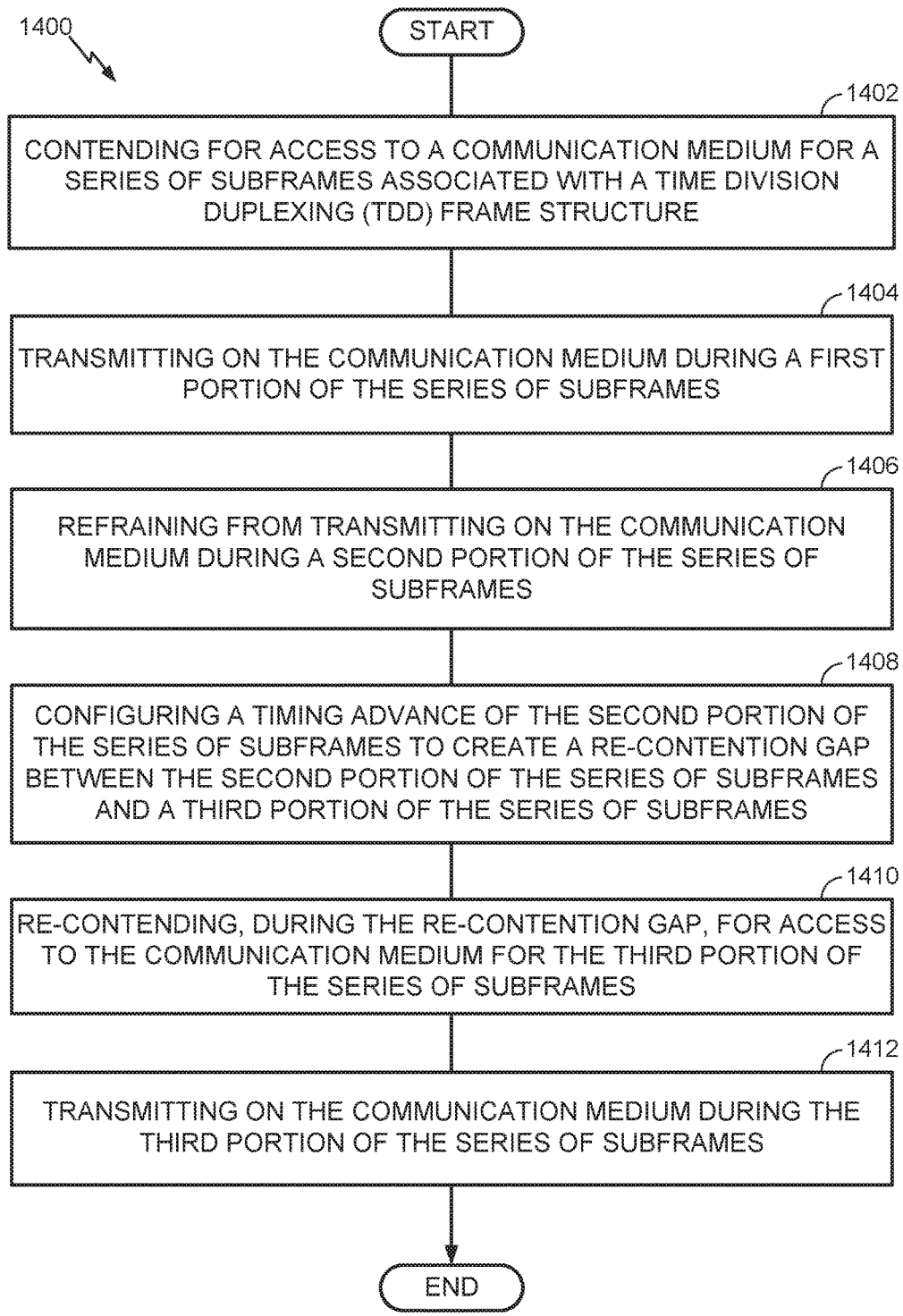
FIG. 14 is a flow diagram illustrating another example method of communication in accordance with the techniques described herein.

FIG. 14 is a flow diagram illustrating another example method of communication in accordance with the techniques described above. The method 1400 may be performed, for example, by an access point (e.g., the access point 110 illustrated in FIG. 1) operating on a shared communication medium. As an example, the communication medium may include one or more time, frequency, or space resources on an unlicensed radio frequency band shared between LTE technology and Wi-Fi technology devices.

As shown, the access point may contend for access to a communication medium for a series of subframes associated with a TDD frame structure (block 1402). The access point may then transmit on the communication medium during a first portion of the series of subframes (block 1404). The access point may, however, refrain from transmitting on the communication medium during a second portion of the series of subframes (block 1406).

At some point, the access point may configure a timing advance of the second portion of the series of subframes to create a re-contention gap between the second portion of the series of subframes and a third portion of the series of subframes (block 1408). It will be appreciated that this operation may be performed at various times in relation to the other operations illustrated in FIG. 14, and that the listing of operations in FIG. 14 is not meant to convey a required or preferred ordering.

The access point may subsequently re-contend, during the re-contention gap, for access to the communication medium for the third portion of the series of subframes (block 1410). The access point may then transmit on the communication medium during the third portion of the series of subframes (block 1412).

As discussed in more detail above, the configuring (block 1408) may include, for example, sending a timing advance command to an access terminal instructing the access terminal to commence uplink transmission prior to a scheduled start time of an uplink subframe of the second portion of the series of subframes. The timing advance command may further instruct the access terminal to shorten a subframe of the first portion of the series of subframes, such as a special subframe preceding the uplink subframe. Here, the special subframe may be shortened by one or more symbol periods as compared to the uplink subframe. As an example, the special subframe may be shortened by between one and three symbol periods as compared to the uplink subframe.

In some designs, a first channel reservation message may be transmitted to reserve the communication medium for the series of subframes. A second channel reservation message may also be transmitted to further reserve the communication medium for the third portion of the series of subframes.

For generality, the access point 110 and the access terminal 120 are shown in FIG. 1 only in relevant part as including the medium access manager 112 and the medium access manager 122, respectively. It will be appreciated, however, that the access point 110 and the access terminal 120 may be configured in various ways to provide or otherwise support the re-contention techniques discussed herein.

Figure 15:
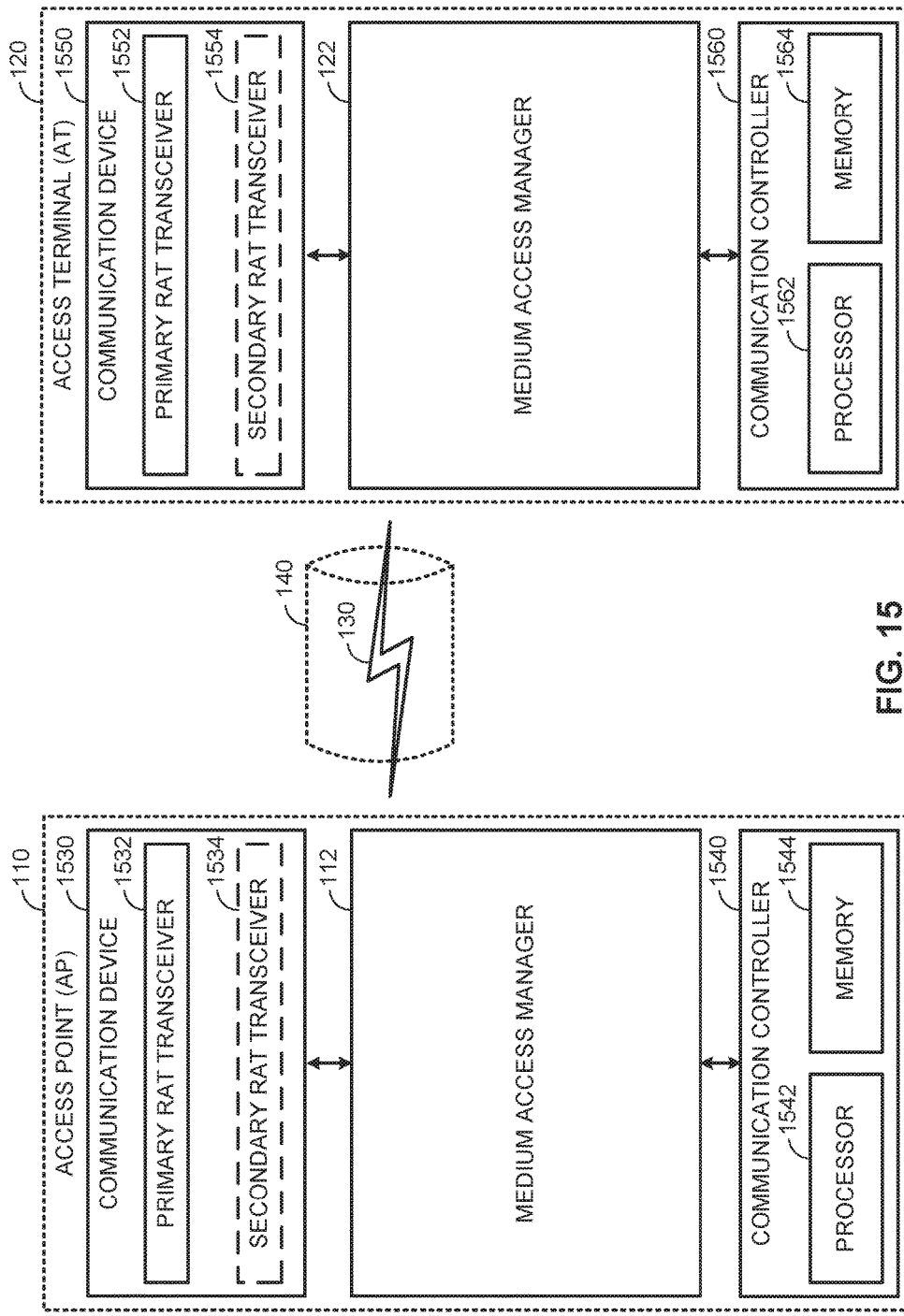
FIG. 15 is a device-level diagram illustrating example components of an access point and an access terminal in more detail.

FIG. 15 is a device-level diagram illustrating example components of the access point 110 and the access terminal 120 of the primary RAT system 100 in more detail. As shown, the access point 110 and the access terminal 120 may each generally include a wireless communication device (represented by the communication devices 1530 and 1550) for communicating with other wireless nodes via at least one designated RAT. The communication devices 1530 and 1550 may be variously configured for transmitting and encoding signals, and, conversely, for receiving and decoding signals in accordance with the designated RAT (e.g., messages, indications, information, pilots, and so on).

The communication devices 1530 and 1550 may include, for example, one or more transceivers, such as respective primary RAT transceivers 1532 and 1552, and, in some designs, (optional) co-located secondary RAT transceivers 1534 and 1554, respectively (corresponding, for example, to the RAT employed by the competing RAT system 150). As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a radio chip or similar circuitry providing low-level sniffing only). Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The access point 110 and the access terminal 120 may also each generally include a communication controller (represented by the communication controllers 1540 and 1560) for controlling operation of their respective communication devices 1530 and 1550 (e.g., directing, modifying, enabling, disabling, etc.). The communication controllers 1540 and 1560 may include one or more processors 1542 and 1562, and one or more memories 1544 and 1564 coupled to the processors 1542 and 1562, respectively. The memories 1544 and 1564 may be configured to store data, instructions, or a combination thereof, either as on-board cache memory, as separate components, a combination, etc. The processors 1542 and 1562 and the memories 1544 and 1564 may be standalone communication components or may be part of the respective host system functionality of the access point 110 and the access terminal 120.

It will be appreciated that the medium access manager 112 and the medium access manager 122 may be implemented in different ways. In some designs, some or all of the functionality associated therewith may be implemented by or otherwise at the direction of at least one processor (e.g., one or more of the processors 1542 and/or one or more of the processors 1562) and at least one memory (e.g., one or more of the memories 1544 and/or one or more of the memories 1564). In other designs, some or all of the functionality associated therewith may be implemented as a series of interrelated functional modules.

Figure 16:
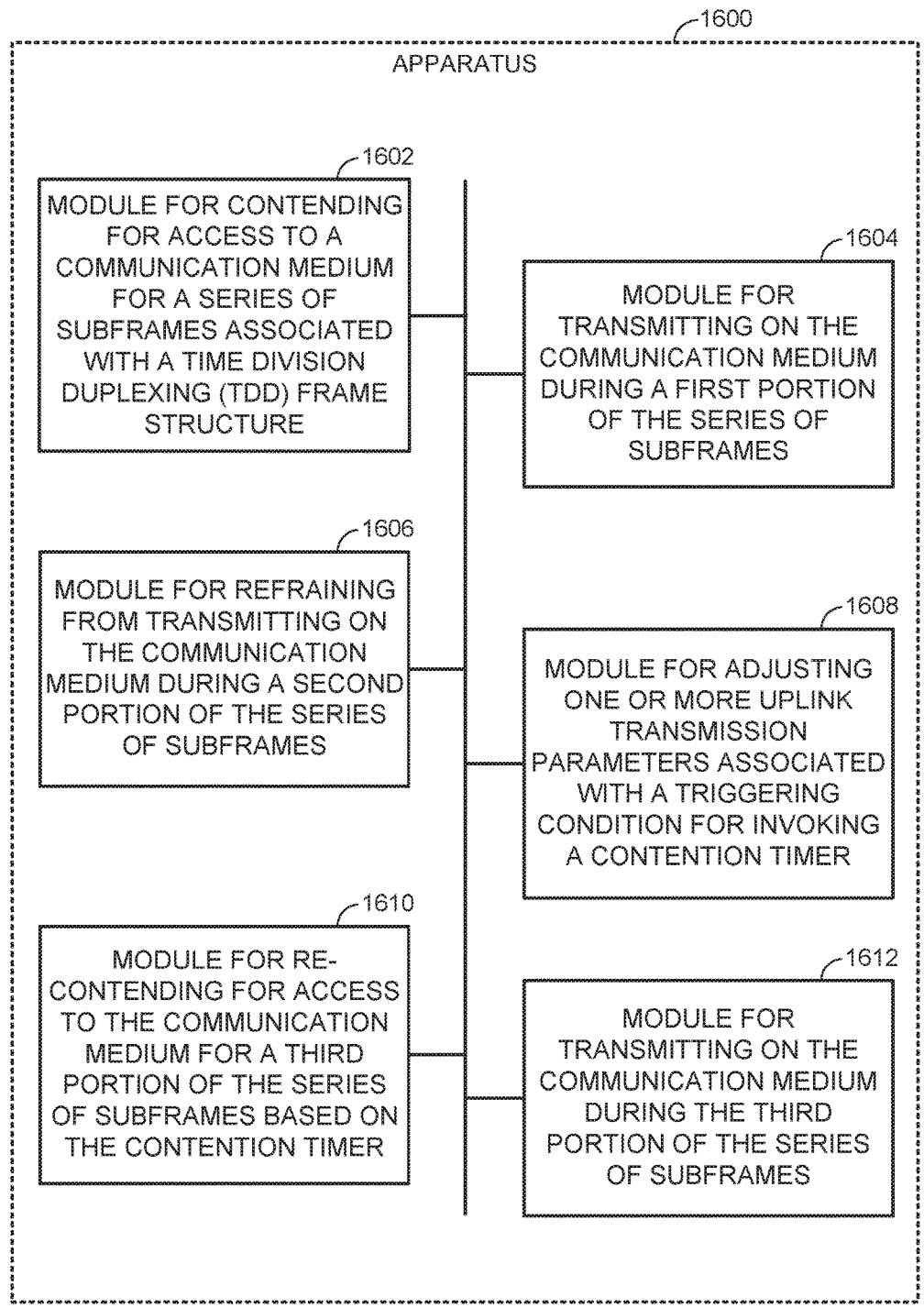
FIG. 16 illustrates an example apparatus represented as a series of interrelated functional modules.

FIG. 16 illustrates an example apparatus for implementing the medium access manager 112 represented as a series of interrelated functional modules. In the illustrated example, the apparatus 1600 includes a module for contending 1602, a module for transmitting 1604, a module for refraining from transmitting 1606, a module for adjusting 1608, a module re-contending 1610, and a module for transmitting 1612.

The module for contending 1602 may be configured to contend for access to a communication medium for a series of subframes associated with a TDD frame structure. The module for transmitting 1604 may be configured to transmit on the communication medium during a first portion of the series of subframes. The module for refraining from transmitting 1606 may be configured to refrain from transmitting on the communication medium during a second portion of the series of subframes. The module for adjusting 1208 may be configured to adjust one or more uplink transmission parameters associated with a triggering condition for invoking a contention timer. The module for re-contending 1610 may be configured to re-contend for access to the communication medium for a third portion of the series of subframes based on the contention timer. The module for transmitting 1612 may be configured to transmit on the communication medium during the third portion of the series of subframes.

Figure 17:
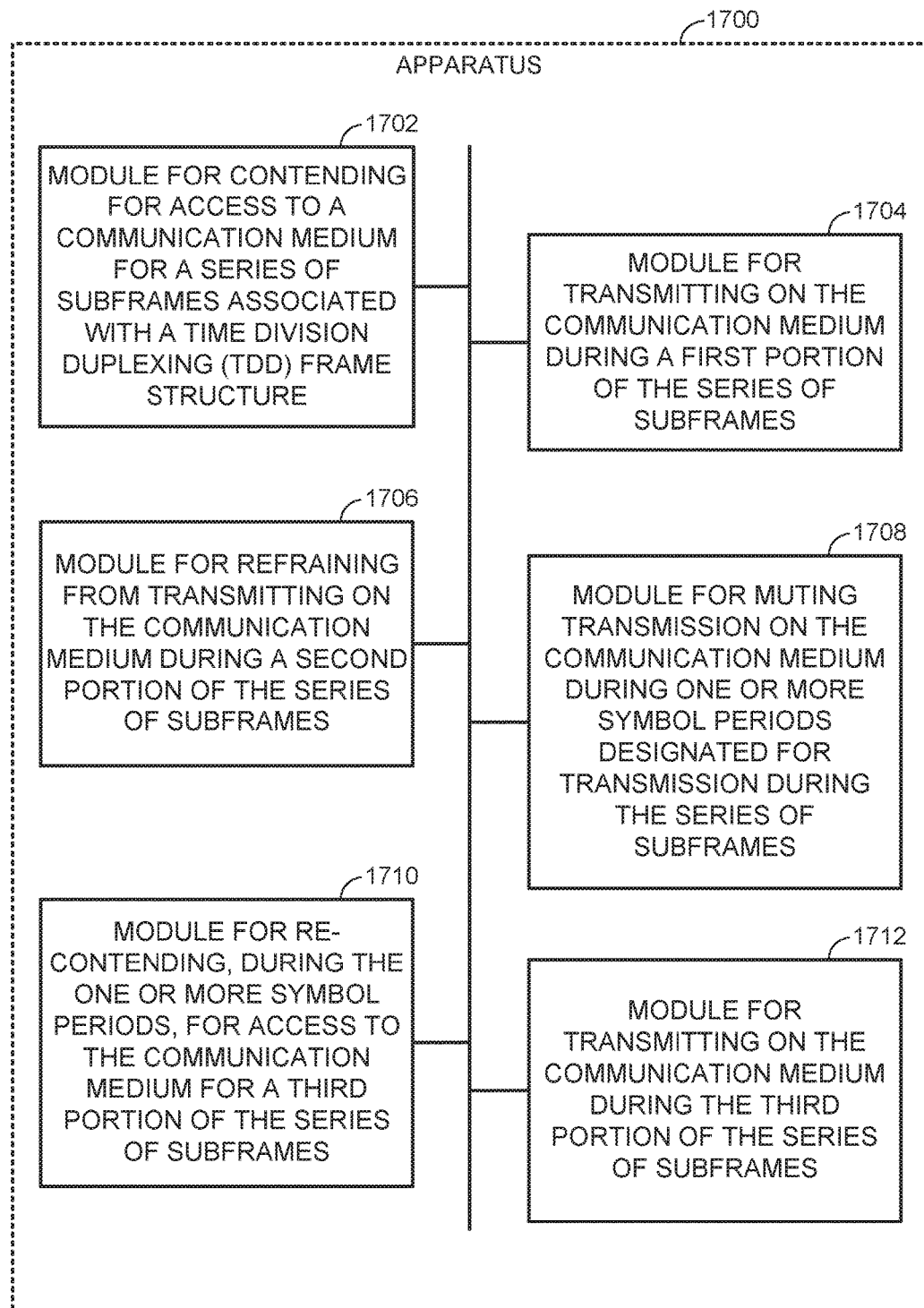
FIG. 17 illustrates an example apparatus represented as a series of interrelated functional modules.

FIG. 17 illustrates an example apparatus for implementing the medium access manager 112 represented as a series of interrelated functional modules. In the illustrated example, the apparatus 1700 includes a module for contending 1702, a module for transmitting 1704, a module refraining from transmitting 1706, a module for muting 1708, a module for re-contending 1710, and a module for transmitting 1712.

The module for contending 1702 may be configured to contend for access to a communication medium for a series of subframes associated with a TDD frame structure. The module for transmitting 1704 may be configured to transmit on the communication medium during a first portion of the series of subframes. The module for refraining from transmitting 1706 may be configured to refrain from transmitting on the communication medium during a second portion of the series of subframes.

The module for muting 1708 may be configured to mute transmission on the communication medium during one or more symbol periods designated for transmission during the series of subframes. The module for re-contending 1710 may be configured to re-contend, during the one or more symbol periods, for access to the communication medium for a third portion of the series of subframes. The module for transmitting 1712 may be configured to transmit on the communication medium during the third portion of the series of subframes.

Figure 18:
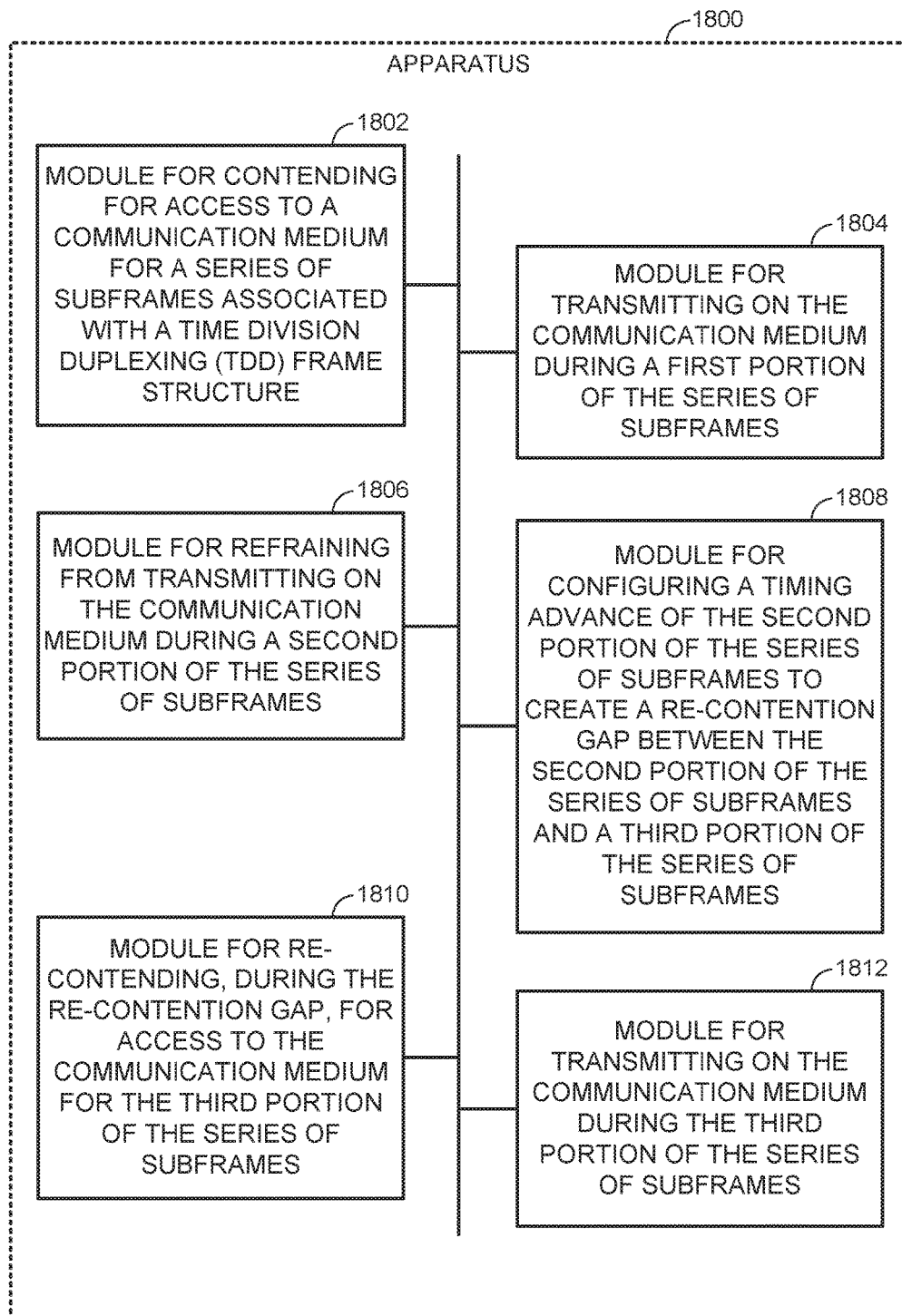
FIG. 18 illustrates an example apparatus represented as a series of interrelated functional modules.

FIG. 18 illustrates an example apparatus for implementing the medium access manager 112 represented as a series of interrelated functional modules. In the illustrated example, the apparatus 1800 includes a module for contending 1802, a module for transmitting 1804, a module for refraining from transmitting 1806, a module for configuring 1808, a module for re-contending 1810, and a module for transmitting 1812.

The module for contending 1802 may be configured to contend for access to a communication medium for a series of subframes associated with a TDD frame structure. The module for transmitting 1804 may be configured to transmit on the communication medium during a first portion of the series of subframes. The module for refraining from transmitting 1806 may be configured to refrain from transmitting on the communication medium during a second portion of the series of subframes.

The module for configuring 1808 may be configured to configure a timing advance of the second portion of the series of subframes to create a re-contention gap between the second portion of the series of subframes and a third portion of the series of subframes. The module for re-contending 1810 may be configured to re-contend, during the re-contention gap, for access to the communication medium for the third portion of the series of subframes. The module for transmitting 1812 may be configured to transmit on the communication medium during the third portion of the series of subframes.

The functionality of the modules of FIGS. 16-18 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 16-18, as well as other components and functions described herein, may be implemented using any suitable means. Such means also may be implemented, at least in part, using corresponding structure as taught herein. For example, the components described above in conjunction with the "module for" components of FIGS. 16-18 also may correspond to similarly designated "means for" functionality. Thus, in some aspects one or more of such means may be implemented using one or more of processor components, integrated circuits, or other suitable structure as taught herein, including as an algorithm. One skilled in the art will recognize in this disclosure an algorithm represented in the prose described above, as well in sequences of actions that may be represented by pseudocode. For example, the components and functions represented by FIGS. 16-18 may include code for performing a LOAD operation, a COMPARE operation, a RETURN operation, an IF-THEN-ELSE loop, and so on.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a transitory or non-transitory computer-readable medium embodying a method for communication.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A communication method, comprising:
    contending for access to a communication medium for a series of subframes associated with a Time Division Duplexing (TDD) frame structure;
    transmitting on the communication medium during a first portion of the series of subframes;
    refraining from transmitting on the communication medium during a second portion of the series of subframes;
    adjusting one or more uplink transmission parameters associated with a triggering condition for invoking a contention timer, wherein:
        the one or more uplink transmission parameters comprise a sub-band scheduling parameter,
        the adjusting comprises scheduling an access terminal in a first subset of resources of the second portion of the series of subframes; and
    re-contending for access to the communication medium for a third portion of the series of subframes based on the contention timer, wherein the re-contending comprises monitoring signaling on a second subset of resources of the second portion of the series of subframes different from the first subset of resources; and
    transmitting on the communication medium during the third portion of the series of subframes.

2. The method of claim 1, further comprising transmitting the adjusted one or more uplink transmission parameters to an access terminal.

3. The method of claim 1, wherein the triggering condition comprises a backoff threshold.

4. The method of claim 1, wherein the adjusting is based on a proximity of the access terminal to an access point.

5. The method of claim 1, wherein:
    the one or more uplink transmission parameters further comprise a transmission power parameter; and
    the adjusting further comprises limiting a signal strength or a number of transmission resources associated with an access terminal to below a level associated with the triggering condition.

6. The method of claim 1, wherein:
    the one or more uplink transmission parameters further comprise a multi-user scheduling parameter; and the adjusting further comprises refraining from scheduling any access terminals having a signal strength above a threshold in a subframe that is adjacent to the third portion of the series of subframes.

7. The method of claim 1, further comprising transmitting a channel reservation message to reserve the communication medium for the series of subframes.

8. A communication apparatus, comprising:
 at least one processor;
 at least one memory coupled to the at least one processor, the at least one processor and the at least one memory being configured to contend for access to a communication medium for a series of subframes associated with a Time Division Duplexing (TDD) frame structure; and
 at least one transceiver configured to transmit on the communication medium during a first portion of the series of subframes and to refrain from transmitting on the communication medium during a second portion of the series of subframes,
 wherein the at least one processor and the at least one memory are further configured to:
  adjust one or more uplink transmission parameters associated with a triggering condition for invoking a contention timer, wherein the one or more uplink transmission parameters comprise a sub-band scheduling parameter, wherein to perform the adjusting, the at least one processor and the at least one memory are further configured to schedule an access terminal in a first subset of resources of the second portion of the series of subframes; and
 the at least one transceiver is further configured to:
  re-contend for access to the communication medium for a third portion of the series of subframes based on the contention timer, wherein to perform the re-contending, the at least one transceiver is configured to monitor signaling on a second subset of resources of the second portion of the series of subframes different from the first subset of resources; and
  transmit on the communication medium during the third portion of the series of subframes.

9. The apparatus of claim 8,
 wherein the at least one transceiver is further configured to
  transmit the adjusted one or more uplink transmission parameters to an access terminal.

10. The apparatus of claim 8, wherein the triggering condition comprises a backoff threshold.

11. The apparatus of claim 8, wherein the at least one processor and the at least one memory are configured to adjust the one or more uplink transmission parameters based on a proximity of the access terminal to an access point.

12. The apparatus of claim 8, wherein:
 the one or more uplink transmission parameters further comprise a transmission power parameter; and
 the at least one processor and the at least one memory are further configured to limit a signal strength or a number of transmission resources associated with an access terminal to below a level associated with the triggering condition.

13. The apparatus of claim 8, wherein:
 the one or more uplink transmission parameters further comprise a multi-user scheduling parameter; and
 the at least one processor and the at least one memory are further configured to refrain from scheduling any access terminals having a signal strength above a threshold in a subframe that is adjacent to the third portion of the series of subframes.

14. The apparatus of claim 8, wherein the at least one transceiver is further configured to transmit a channel reservation message to reserve the communication medium for the series of subframes.

15. A communication apparatus, comprising:
 means for contending for access to a communication medium for a series of subframes associated with a Time Division Duplexing (TDD) frame structure;
 means for transmitting on the communication medium during a first portion of the series of subframes;
 means for refraining from transmitting on the communication medium during a second portion of the series of subframes;
 means for adjusting one or more uplink transmission parameters associated with a triggering condition for invoking a contention timer, wherein:
  the one or more uplink transmission parameters comprise a sub-band scheduling parameter; and
  the means for adjusting comprises means for scheduling an access terminal in a first subset of resources of the second portion of the series of subframes; and
 means for re-contending for access to the communication medium for a third portion of the series of subframes based on the contention timer, wherein the means for re-contending comprises means for monitoring signaling on a second subset of resources of the second portion of the series of subframes different from the first subset of resources; and
 means for transmitting on the communication medium during the third portion of the series of subframes.

16. The apparatus of claim 15, further comprising:
 means for transmitting the adjusted one or more uplink transmission parameters to an access terminal.

17. The apparatus of claim 15, wherein the triggering condition comprises a backoff threshold.

18. The apparatus of claim 15, wherein the adjusting is based on a proximity of the access terminal to an access point.

19. The apparatus of claim 15, wherein:
 the one or more uplink transmission parameters further comprise a transmission power parameter; and
 the means for adjusting further comprises means for limiting a signal strength or a number of transmission resources associated with an access terminal to below a level associated with the triggering condition.

20. The apparatus of claim 15, wherein:
 the one or more uplink transmission parameters further comprise a multi-user scheduling parameter; and
 the means for adjusting further comprises means for refraining from scheduling any access terminals having a signal strength above a threshold in a subframe that is adjacent to the third portion of the series of subframes.

21. A non-transitory computer-readable medium comprising code, which, when executed by a processor, causes the processor to perform operations for communication, the non-transitory computer-readable medium comprising:
 code for contending for access to a communication medium for a series of subframes associated with a Time Division Duplexing (TDD) frame structure;
 code for transmitting on the communication medium during a first portion of the series of subframes;
 code for refraining from transmitting on the communication medium during a second portion of the series of subframes;

code for adjusting one or more uplink transmission parameters associated with a triggering condition for invoking a contention timer, wherein:

the one or more uplink transmission parameters comprise a sub-band scheduling parameter; and the code for adjusting comprises code for scheduling an access terminal in a first subset of resources of the second portion of the series of subframes; and code for re-contending for access to the communication medium for a third portion of the series of subframes based on the contention timer, wherein the code for re-contending comprises code for monitoring signaling on a second subset of resources of the second portion of the series of subframes different from the first subset of resources; and code for transmitting on the communication medium during the third portion of the series of subframes.

22. The non-transitory computer-readable medium of claim 21, further comprising code for transmitting the adjusted one or more uplink transmission parameters to an access terminal.

23. The non-transitory computer-readable medium of claim 21, wherein the triggering condition comprises a backoff threshold.

24. The non-transitory computer-readable medium of claim 21, wherein the adjusting is based on a proximity of the access terminal to an access point.

25. The non-transitory computer-readable medium of claim 21, wherein:

the one or more uplink transmission parameters further comprise a transmission power parameter; and the code for adjusting further comprises code for limiting a signal strength or a number of transmission resources associated with an access terminal to below a level associated with the triggering condition.

26. The non-transitory computer-readable medium of claim 21, wherein:

the one or more uplink transmission parameters further comprise a multi-user scheduling parameter; and the code for adjusting further comprises code for refraining from scheduling any access terminals having a signal strength above a threshold in a subframe that is adjacent to the third portion of the series of subframes.

* * * * *